US012699963B2

(12) United States Patent
Voltz et al.

(10) Patent No.: US 12,699,963 B2
(45) Date of Patent: Aug. 4, 2026

(54) HANDLING ELECTRONIC SIGNATURES IN COLLABORATION SYSTEMS

(71) Applicant: Box, Inc., Redwood City, CA (US)

(72) Inventors: Seth Morgan Luce Voltz, Portland, OR (US); Jón Tómas Grétarsson, Redwood City, CA (US); Michaël Simon Krens, Amsterdam (NL); Valentin Zberea, Amsterdam (NL); Rohit Bakshi, Campbell, CA (US); Matthew Phillip Hewes, San Jose, CA (US); Daniel Kim, Santa Clara, CA (US); Nachiket Deo, San Jose, CA (US); Stephen Philip Hiller, Santa Clara, CA (US); Virender Gupta, Morganville, NJ (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 18/806,675

(22) Filed: Aug. 15, 2024

(65) Prior Publication Data

US 2025/0053924 A1    Feb. 13, 2025

Related U.S. Application Data

(63) Continuation of application No. 17/706,500, filed on Mar. 28, 2022, now Pat. No. 12,067,531.

(Continued)

(51) Int. Cl.
*G06Q 30/00*     (2023.01)
*G06Q 10/101*    (2023.01)
*H04L 9/32*      (2006.01)

(52) U.S. Cl.
CPC ......... *G06Q 10/101* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,503,900 | B2 | 12/2019 | Zhang |
| 2007/0192609 | A1 | 8/2007 | Yoshioka et al. |

(Continued)

OTHER PUBLICATIONS

G. Wawrzyniak and I. El Fray, "New XML Signature Scheme That is Resistant to Some Attacks," in IEEE Access, vol. 8, pp. 35815-35831, 2020, doi: 10.1109/ACCESS.2020.2975034. (Year: 2020).*

(Continued)

*Primary Examiner* — Matthew T Sittner
(74) *Attorney, Agent, or Firm* — Vista IP Law Group, LLP

(57)     ABSTRACT

Methods, systems, and computer program products for gathering electronic signatures to be applied to collaboration system content objects (e.g., contracts, letters, insurance claims, riders, etc.). A collaboration system monitors changes made to the collaboration system content objects during electronic signature processing. A module of the content management system is configured to associate one or more instances of e-signing metadata to one or more of the stored content objects of the content management system. The e-signing metadata indicates whether or not a particular portion of the one or more of the stored content objects has been e-signed by a designated e-signatory. A collaborator who is not one of the designated e-signatories makes a change to one or more of the stored content objects (e.g., contracts, letters, insurance claims, riders, etc.). The change is remediated on-the-fly and the e-signing process continues without having to restart the e-signing process from the beginning.

19 Claims, 15 Drawing Sheets

Related U.S. Application Data

(60) Provisional application No. 63/262,127, filed on Oct. 5, 2021.

(56) References Cited

U.S. PATENT DOCUMENTS

| | | | |
|---|---|---|---|
| 2008/0016564 A1 | 1/2008 | Claudatos et al. | |
| 2009/0063535 A1 | 3/2009 | Petri | |
| 2011/0276875 A1 | 11/2011 | Mccabe et al. | |
| 2012/0086971 A1 | 4/2012 | Bisbee et al. | |
| 2014/0164776 A1* | 6/2014 | Hook | G06F 21/6218 |
| | | | 713/171 |
| 2014/0297629 A1 | 10/2014 | Lin | |
| 2015/0100546 A1* | 4/2015 | Eberlein | G06F 16/1787 |
| | | | 707/610 |
| 2015/0163206 A1* | 6/2015 | McCarthy | G06F 21/6227 |
| | | | 726/4 |
| 2015/0213568 A1 | 7/2015 | Follis et al. | |
| 2016/0162697 A1 | 6/2016 | Follis | |
| 2016/0314102 A1 | 10/2016 | Bezar et al. | |
| 2017/0041296 A1* | 2/2017 | Ford | G06F 21/64 |
| 2020/0067975 A1* | 2/2020 | Ojha | G06F 21/6218 |
| 2020/0068026 A1 | 2/2020 | Morkovine et al. | |
| 2020/0145232 A1 | 5/2020 | Haddad | |
| 2020/0382557 A1 | 12/2020 | Woolward et al. | |
| 2022/0206644 A1* | 6/2022 | Spaetzel | G06F 40/143 |
| 2022/0327541 A1 | 10/2022 | Seguritan et al. | |
| 2023/0016689 A1 | 1/2023 | Voltz et al. | |

OTHER PUBLICATIONS

Loddo OG, Addis A and Lorini G (2022) Intersemiotic translation of contracts into digital environments. Front. Artif. Intell. 5:963692. doi: 10.3389/frai.2022.963692 (Year: 2022).*

"Dotloop's Accept or Counter Flow: A BetterEsign Experience," dotloop, Inc., dated May 4, 2017.

"Sending and Signing with eHanko," DocuSign Support, date found via WayBack as Aug. 13, 2020.

"Allow DocuSign recipients to edit documents," date found via Google as Sep. 3, 2020.

Walker, A., "How do I edit a signed PDF document," Acrobat Library, date found via Google as Nov. 3, 2021 URL: https://answers.acrobatusers.com/How-I-edit-signed-PDF-document-q58365.aspx.

"Can I edit a PDF that I signed?," Adobe, last edited Mar. 2, 2022.

Dizon-Ngo, J., "How to edit and resend a signature request," HelloSign, dated Nov. 10, 2021.

Miller, R., "Dropbox to acquire secure document sharing startup DocSend for $165M," techcrunch.com, dated Mar. 9, 2021.

Sawers, P., "Dropbox acquires e-signature startup HelloSign for $230 million," VentureBeat.com, dated Jan. 28, 2019.

"Make your first API call in a few steps," HelloSign API, date obtained via Google as May 14, 2014, URL: https://app.hellosign.com/api/documentation.

Hueter, K., "Setting up and Using the Dropbox Integration," HelloSign, dated Jan. 20, 2022, URL: https://faq.hellosign.com/hc/en-us/articles/205830688-Setting-up-and-Using-the-Dropbox-Integration.

Non-Final Office Action dated Aug. 23, 2023 for U.S. Appl. No. 17/376,110.

Non-Final Office Action dated Nov. 8, 2023 for U.S. Appl. No. 17/706,500.

Final Office Action dated Jan. 24, 2024 for U.S. Appl. No. 17/376,110.

Notice of Allowance dated Apr. 10, 2024 for U.S. Appl. No. 17/706,500.

Notice of Allowance dated May 30, 2024 for U.S. Appl. No. 17/376,110.

Notice of Allowance dated Sep. 20, 2024 for U.S. Appl. No. 17/376,110.

Non-Final Office Action dated Sep. 23, 2025 for U.S. Appl. No. 18/592,430.

Notice of Allowance dated Feb. 6, 2026 for U.S. Appl. No. 18/592,430.

Non-Final Office Action dated May 18, 2026, for U.S. Appl. No. 19/030,695.

Non-Final Office Action dated May 18, 2026, for U.S. Appl. No. 19/030,739.

Notice of Allowance dated Jun. 23, 2026 for U.S. Appl. No. 18/592,430.

* cited by examiner

2A00

4B00

Rulebase 441

418

FOR EACH change:

Rule 443₁

442
Determine method to handle the change

Rule 443₂

444
Determine impact of the change with respect to other changes

Rule 443₃

445
Remediate conflicts that arise when considering the change with respect to other changes

446
Identify additions and deletions (e.g., prepare a REDLINE)

448
Add an ephemeral annotation corresponding to the change

449
Store an abstract of the change and its remediation

Content Object Data 222

END FOR

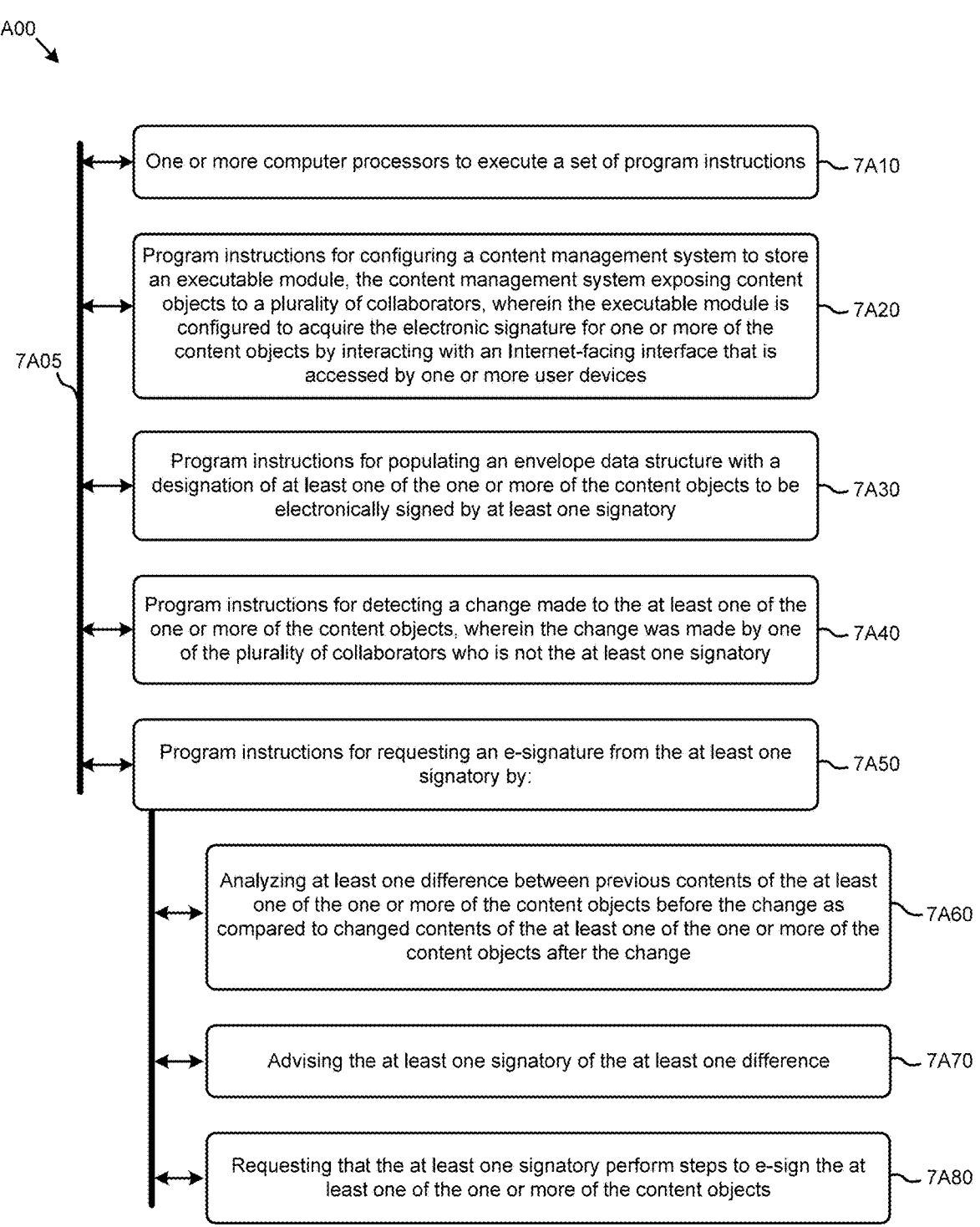

One or more computer processors to execute a set of program instructions ⟋7A10

Program instructions for configuring a content management system to store an executable module, the content management system exposing content objects to a plurality of collaborators, wherein the executable module is configured to acquire the electronic signature for one or more of the content objects by interacting with an Internet-facing interface that is accessed by one or more user devices ⟋7A20

Program instructions for populating an envelope data structure with a designation of at least one of the one or more of the content objects to be electronically signed by at least one signatory ⟋7A30

Program instructions for detecting a change made to the at least one of the one or more of the content objects, wherein the change was made by one of the plurality of collaborators who is not the at least one signatory ⟋7A40

Program instructions for requesting an e-signature from the at least one signatory by: ⟋7A50

Analyzing at least one difference between previous contents of the at least one of the one or more of the content objects before the change as compared to changed contents of the at least one of the one or more of the content objects after the change ⟋7A60

Advising the at least one signatory of the at least one difference ⟋7A70

Requesting that the at least one signatory perform steps to e-sign the at least one of the one or more of the content objects ⟋7A80

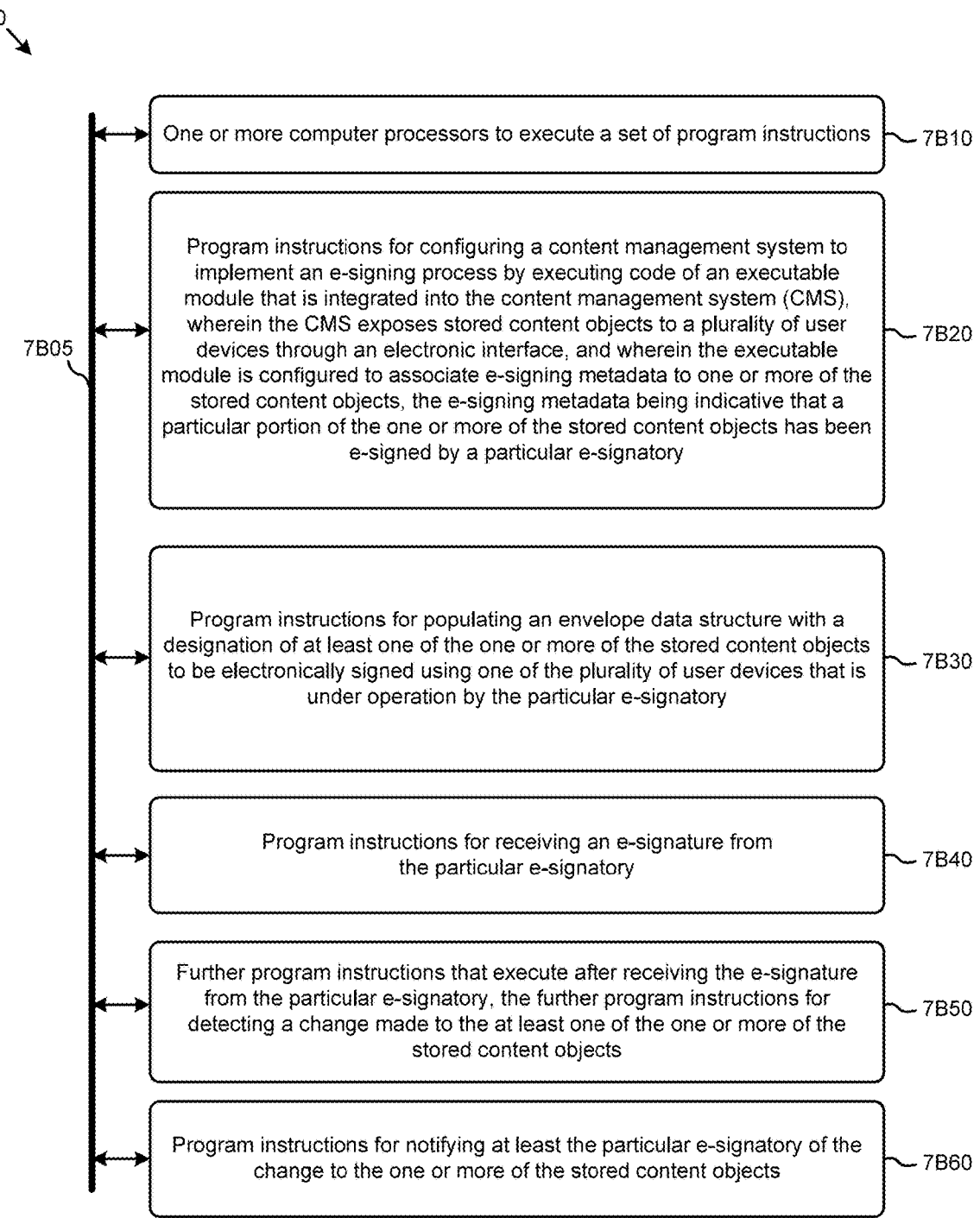

7B05

One or more computer processors to execute a set of program instructions —7B10

Program instructions for configuring a content management system to implement an e-signing process by executing code of an executable module that is integrated into the content management system (CMS), wherein the CMS exposes stored content objects to a plurality of user devices through an electronic interface, and wherein the executable module is configured to associate e-signing metadata to one or more of the stored content objects, the e-signing metadata being indicative that a particular portion of the one or more of the stored content objects has been e-signed by a particular e-signatory —7B20

Program instructions for populating an envelope data structure with a designation of at least one of the one or more of the stored content objects to be electronically signed using one of the plurality of user devices that is under operation by the particular e-signatory —7B30

Program instructions for receiving an e-signature from the particular e-signatory —7B40

Further program instructions that execute after receiving the e-signature from the particular e-signatory, the further program instructions for detecting a change made to the at least one of the one or more of the stored content objects —7B50

Program instructions for notifying at least the particular e-signatory of the change to the one or more of the stored content objects —7B60

FIG. 7B

HANDLING ELECTRONIC SIGNATURES IN COLLABORATION SYSTEMS

RELATED APPLICATIONS

The present application is a continuation of U.S. patent application Ser. No. 17/706,500, titled "HANDLING ELECTRONIC SIGNATURES IN COLLABORATION SYSTEMS" and filed on Mar. 28, 2022, which claims the benefit of priority to U.S. Prov. Pat. App. Ser. No. 63/262, 127 titled "HANDLING ELECTRONIC SIGNATURES IN COLLABORATION SYSTEMS" and filed on Oct. 5, 2021. The entire contents of the aforementioned U.S. patent application and U.S. provisional application are hereby explicitly incorporated by reference in their respective entireties for all purposes.

TECHNICAL FIELD

This disclosure relates to collaboration systems, and more particularly to techniques for handling electronic signatures in collaboration systems.

BACKGROUND

Collaboration systems have become ubiquitous, and are being used more and more every day to facilitate how teams work together. Technological advances in certain areas have not kept pace with the technological demands that teams place on collaboration systems. One such area where team member demands outstrip the pace of technological advances pertains to handling of electronic signatures ("e-signatures"). The legally binding nature of e-signatures and their ubiquity in business settings has greatly reduced the administrative burden of getting legally-binding "sign-off" from stakeholders. This is especially true when there are many e-signatories and/or when multiple e-signatories have to e-sign in a particular order. However the availability of e-signatures by itself has not made the processes of reaching agreement among e-signatories any simpler. In fact, the ease with which an envelope (e.g., e-signing instructions) can be created and send out sometimes causes the originator of a document to be e-signed to "jump the gun" by sending out an e-sign request when a document is almost—but not quite—ready to be circulated for e-signatures. This sets up the highly undesirable possibility that at some point in the overall e-signing process it can happen that one of the stakeholders (e.g., e-signatories or their proxies) notices a change that needs to be made to the document.

In some cases, e-signatures are intended to be collected in a particular order. Moreover, it sometimes happens that an earlier e-signatory wants to communicate some information to the later e-signatories. In cases where this additional information might influence whether or not a later e-signatory would e-sign, the earlier e-signatory might have no choice but to decline to e-sign, thus interrupting or halting the overall e-signing process while the earlier e-signatory reaches out to the later e-signatory to pass along the afore-mentioned additional information.

In other cases, e-signatures might be originally intended to be collected from specific individuals. However, it can sometimes happen that one of the specific individuals from whom an e-signature is sought becomes unavailable (e.g., in the event of a vacation, or a resignation, or an incapacitation, or a death, etc.). This often causes an interruption of the overall e-signing process, sometimes introducing very significant delays.

In still other cases, an e-signatory might want to make a change to some aspect of the document to be e-signed or to make a change to some aspect of its envelope. While it might be theoretically possible to accommodate certain changes, legacy systems are inept in classifying changes, identifying and resolving conflicts, and responding to such changes, which again often causes an interruption of the overall e-signing process.

Unfortunately, legacy techniques are unable to gracefully handle such situations. Changes to the document or to the set of e-signatories or to envelope information often requires a complete restart of the overall e-signing process, which complete restart involves significant administrative effort. As one example, a restart might involve (1) rescinding the envelope pertaining to the errant document, (2) making the change or changes to the document, (3) certifying the revised document for later authentication, (4) reconfiguring a new envelope, and (5) resending the new envelope with a reference to the revised and newly certified document. This legacy loopback would need to be performed regardless of how small or insignificant the change is. What is needed is a way to avoid having to loop back to the very beginning in the presence of changes that would affect the e-signature process.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for handling electronic signatures in collaboration systems, which techniques advance the relevant technologies to address technological issues with legacy approaches. Certain embodiments are directed to technological solutions for performing on-the-fly changes to an e-signature process based on on-the-fly event detection and/or conflict remediation actions that affect the e-signature process.

The disclosed embodiments modify and improve over legacy approaches. In particular, the herein-disclosed techniques provide technical solutions that address the technical problems attendant to handling change events during an e-signature process. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication. For example, when performing computer operations that address the various technical problems underlying in-flight change events during an e-signature process, both memory usage and CPU cycles demanded are significantly reduced as compared to the memory usage and CPU cycles that would be needed but for practice of the herein-disclosed techniques. This is because, rather than incurring a complete restart of an e-signing process, embodiments of the present disclosure apply changes on-the-fly so as to reduce or eliminate rework.

The ordered combination of steps of the embodiments serve in the context of practical applications that perform steps for performing on-the-fly changes to an e-signature process based on the nature of the detected on-the-fly events. These techniques for applying on-the-fly changes to an e-signature process based on the nature of detected on-the-fly events overcome long-standing yet heretofore unsolved technological problems that arise in the realm of computer systems.

Many of the herein-disclosed embodiments for applying on-the-fly changes to an e-signature process based on on-the-fly event detection and/or conflict remediation actions that affect the e-signature process are technological solutions pertaining to technological problems that arise in the hardware and software arts that underlie collaboration systems. Aspects of the present disclosure achieve performance and other improvements in peripheral technical fields including, but not limited to handling third-party applications that integrate with content management systems.

Some embodiments include a sequence of instructions that are stored on a non-transitory computer readable medium. Such a sequence of instructions, when stored in memory and executed by one or more processors, causes the one or more processors to perform a set of acts for applying on-the-fly changes to an e-signature process based on on-the-fly event detection and/or conflict remediation actions that affect the e-signature process.

Some embodiments include the aforementioned sequence of instructions that are stored in a memory, which memory is interfaced to one or more processors such that the one or more processors can execute the sequence of instructions to cause the one or more processors to implement acts for applying on-the-fly changes to an e-signature process based on on-the-fly event detection and/or conflict remediation actions that affect the e-signature process.

In various embodiments, any combinations of any of the above can be organized to perform any variation of acts for handling electronic signatures in collaboration systems, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 4B is a flowchart that shows a change handling technique as used in systems that detect on-the-fly events and perform on-the-fly remediation during an e-signing process, according to an embodiment.

FIG. 7A and FIG. 7B depict system components as arrangements of computing modules that are interconnected so as to implement certain of the herein-disclosed embodiments.

DETAILED DESCRIPTION

Figures 1A, 1B:
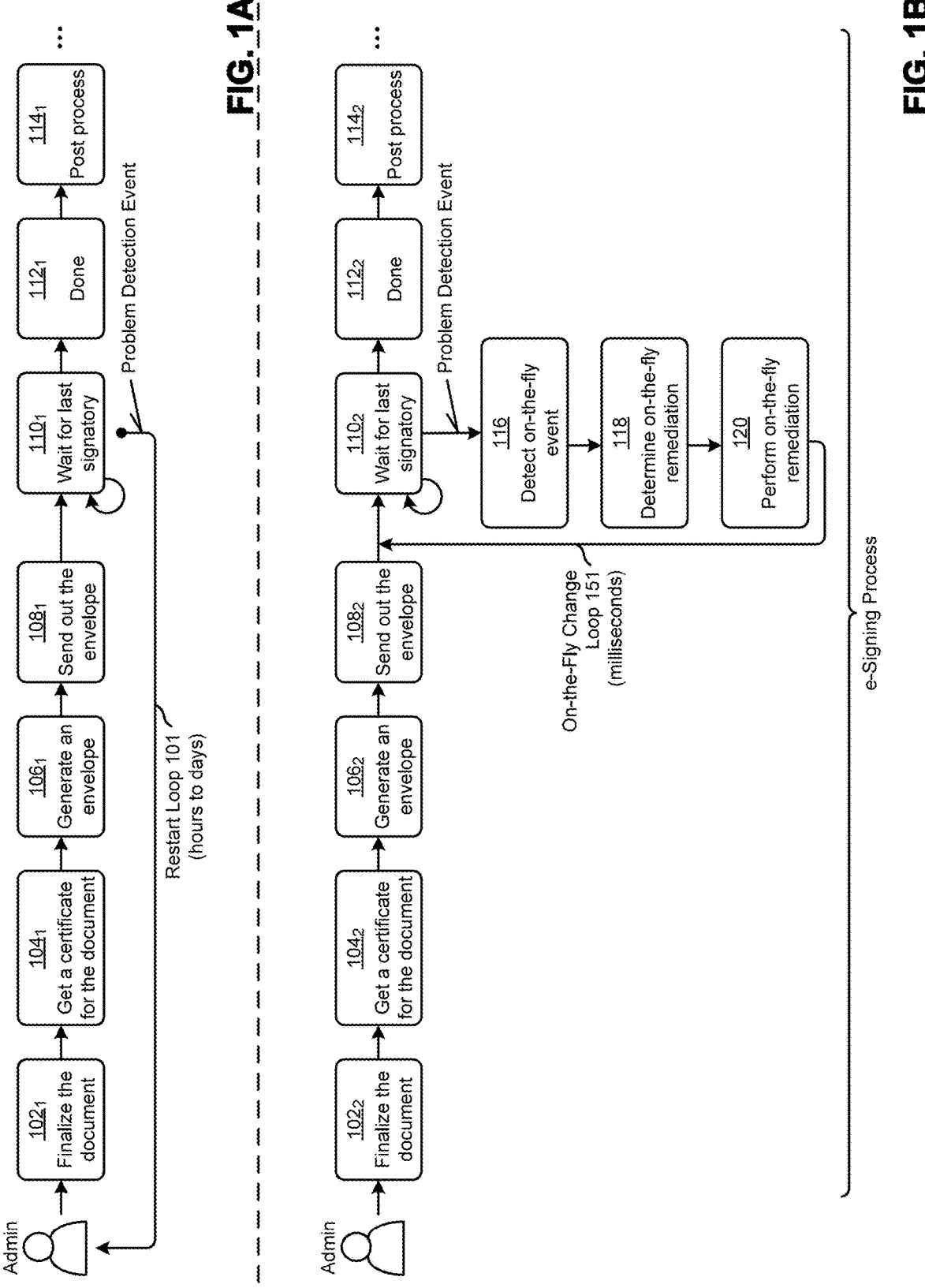
FIG. 1A and FIG. 1B are presented to highlight comparisons between methods for handling events during an e-signing process.

Aspects of the present disclosure solve problems associated with using computer systems for handling change events during an e-signature process. Some embodiments are directed to approaches for applying on-the-fly changes to an ongoing e-signature process based on on-the-fly event detection and/or conflict remediation actions that affect the ongoing e-signature process. The accompanying figures and discussions herein present example environments, systems, methods, and computer program products for handling electronic signatures in collaboration systems.

Overview

Disclosed herein are techniques that gracefully handle a wide variety of e-signing situations. More specifically, disclosed herein are techniques that allow for certain events (e.g., on-the-fly events) that might occur in the e-signing process to be handled (e.g., via on-the-fly remediation) without requiring the e-signing process to be restarted.

Some embodiments implement e-signing workflows that are controlled, at least in part, based on events that are raised in a content management system (CMS). For example, operational elements of a CMS can inform the e-signing process of the occurrence of events that would or could alter a currently running e-signing process.

Some embodiments are able to substitute in alternate or secondary e-signatories in the event that a primary e-signatory is unavailable. Some embodiments are configured to automatically determine such alternate or secondary e-signatories based on inspection of the contents (e.g., terms, contract value, field values, etc.) of the document(s) to be e-signed.

Some embodiments can receive and process events that occur from outside the content management system. For example, a workflow that is operating within or in conjunction with an application hosted by a third-party might emit events that in turn alter in-progress e-signing processes.

In some cases, a different e-signatory such as a deputy or agent or assistant can be designated as an alternate in the event that a primary e-signatory becomes unavailable for e-signing. In some cases, either or both of the primary e-signatory and/or the secondary e-signatories are automatically determined based on a policy or policies. Such policies can be established by an administrator or other user. Additionally or alternatively, such policies can be automatically established by the CMS based on any portions of data available to the CMS. Strictly as one example, a deputy or agent or assistant can be determined based on an organization chart that relates CMS users to other CMS users.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A and FIG. 1B are presented to highlight comparisons between methods for handling events during an e-signing process. As an option, one or more variations of FIG. 1B or any aspect thereof may be implemented in the context of the architecture and functionality of the embodiments described herein and/or in any environment.

The figures are being presented on the same sheet so as to highlight the difference between restart loop $101$ of FIG. 1A (which often incurs hours or days of latency) with on-the-fly change loop $151$ of FIG. 1B (which often incurs only milliseconds of latency).

As shown, the first series of steps in FIG. 1A (e.g., step $102_1$ to finalize the document, step $104_1$ to get a certificate for the document, step $106_1$ to generate an envelope, and step $108_1$ to send out the envelope) are the same as the first series of steps in FIG. 1B (e.g., step $102_2$ to finalize the document, step $104_2$ to get a certificate for the document, step $106_2$ to generate an envelope, and step $108_2$ to send out the envelope). However, if it happens that a problem is detected, or if it happens that some other event occurs that would at least potentially change how the e-signature process is being carried out, then it can be seen that it is much more efficient and is much less time consuming if on-the-fly change loop $151$ is taken rather than restart loop $101$.

Strictly as one non-limiting example, and strictly for comparative purposes, suppose that it were determined that one of the e-signatories is "on vacation" or otherwise unavailable. Further suppose that the e-signatory who is on vacation has a deputy who is authorized to e-sign in absence of the e-signatory who is on vacation. In such a case, notice the long loop (e.g., restart loop $101$) incurred by restarting the e-signing process, this time with the deputy named as an e-signatory, and compare this long loop with the short loop (i.e., the on-the-fly change loop $151$) where the deputy is substituted in as an e-signatory without having to traverse again through the earlier steps.

As can be seen, once a restart has been incurred (e.g., as shown in FIG. 1A), the damage has been done. Even though it might happen that the remaining steps of FIG. 1A (e.g., step $110_1$ to wait for a last e-signatory, step $112_1$ to deem the e-signing process as being completed or done, and step $114_1$ to perform any post processes) are the same as the remaining steps of FIG. 1B (e.g., step $110_2$ to wait for a last e-signatory, step $112_2$ to deem the e-signing process as being completed or done, and step $114_2$ to perform any post processes), the act of traversing the restart loop back to the beginning of the e-signing process has already incurred unwanted latency. On the other hand, various ones of the on-the-fly steps carried out in the on-the-fly loop $151$ (e.g., step $116$ to detect an on-the-fly event, step $118$ to determine on-the-fly remediation, and step $120$ to perform the on-the-fly remediation) can be performed even after a first e-signatory has seen and/or e-signed the subject document.

The foregoing e-signing process might be carried out in whole or in part within a collaboration system that includes ongoing management of content objects such that a plurality of collaborators can concurrently access the content objects from their respective user devices. Further, various portions of the e-signing process can be performed asynchronously with respect to other portions of the e-signing process and/or various processes of the collaboration system. Still further, various data available within a collaboration system might be made available to establish and/or cause permitted behaviors of the e-signing system. Some such asynchrony with respect to various portions of the e-signing process and some such asynchrony with respect to processes of the collaboration system are shown and described as pertains to FIG. 2A.

Figure 2A:
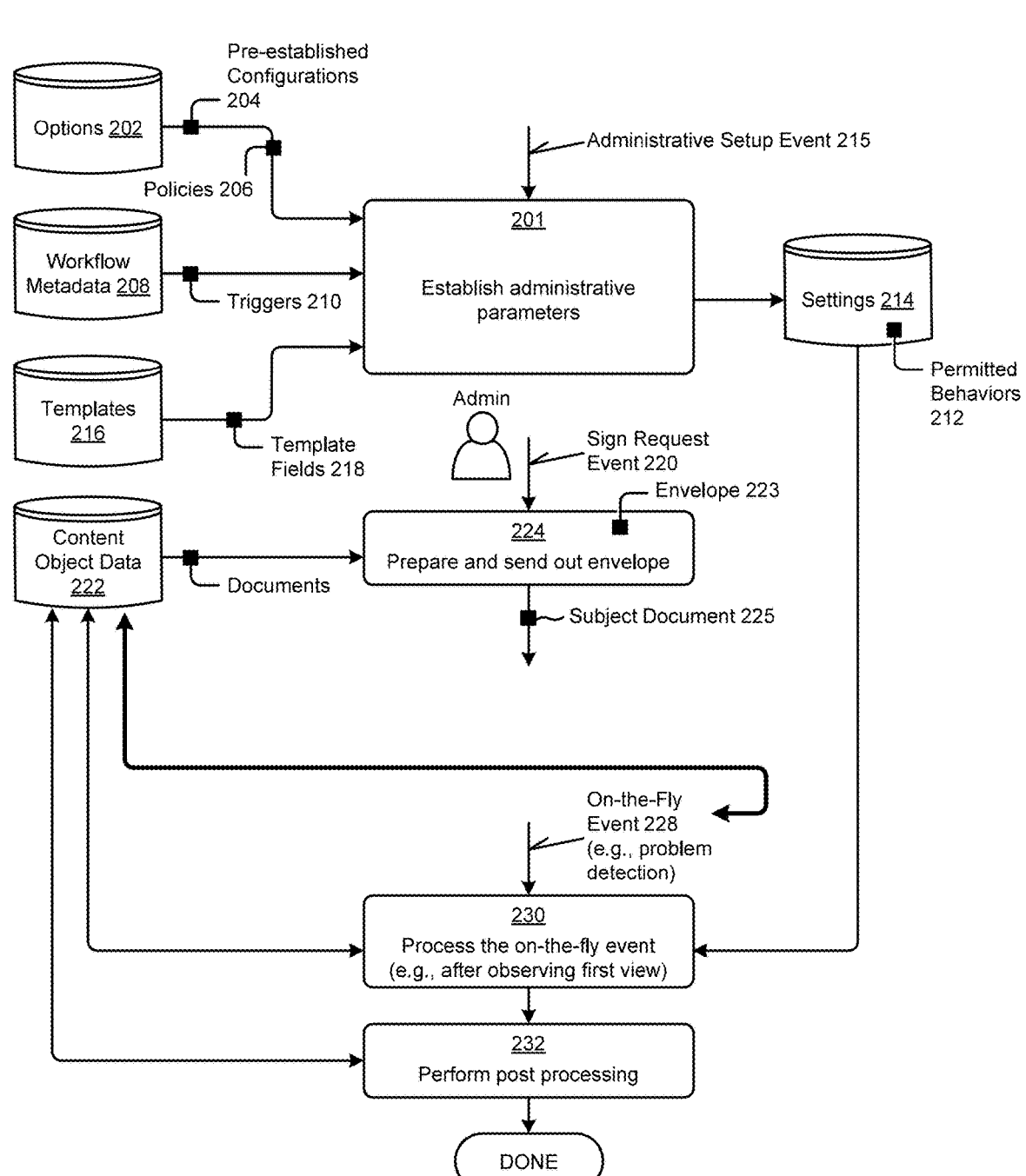
FIG. 2A illustrates an example e-signature system that is configured to detect on-the-fly events and perform on-the-fly remediation during an e-signing process, according to an embodiment.

FIG. 2A illustrates an example e-signature system that is configured to detect on-the-fly events and perform on-the-fly remediation during an e-signing process. As an option, one or more variations of e-signature system 2A00 or any aspect thereof may be implemented in the context of the architecture and functionality of the embodiments described herein and/or in any environment.

The figure is being presented to illustrate various e-signing processes that can be invoked asynchronously based on asynchronously occurring events. Specifically, the figure shows an administrative setup event 215, an e-sign request event 220, and an on-the-fly event 228, any of which events can occur asynchronously with respect to each other. Moreover, the figure shows that some e-sign processes are invoked in response to an administrative setup event 215, whereas other e-sign processes are invoked in response to an e-sign request event 220, and whereas still other e-sign processes are invoked in response to an on-the-fly event 228.

In this particular embodiment, a set of administrative parameters are established (step 201) and stored into a repository (e.g., settings 214), the contents of which are made available to other portions of the e-signing process. Options 202 and the administrative parameters might be extensive, possibly involving pre-established configurations 204, workflow metadata 208, and templates 216. Workflow metadata 208 might include triggers 210 pertaining to workflow events that in turn trigger e-signing events. Additionally or alternatively, workflow metadata 208 might include triggers 210 pertaining workflows and/or workflow entry points that are triggered based on occurrences of one or more e-signing events.

Templates 216 might include template fields 218. Any of the foregoing can be used as inputs to step 201, which in turn outputs (e.g., under administrative command) settings 214 that codify permitted behaviors 212 of the e-signing system. In some cases templates include combinations of mutable and immutable document fields, and such fields can codify and/or operate over any one or more of: e-signatory roles, non-signatory roles, a preferred e-signing order, an alternate e-signing order, an e-signing order that includes one or more delegates to an e-signatory, predetermined phrases or paragraphs (in any of a wide range of languages) that are used in notifications to users (e.g., notifications via short messaging service (SMS) messages, notifications via emails, notification via GUI pop-up messages, etc.). Such templates can me made visible to all users of the CMS, or such templates can me made visible to selected sets of users of the CMS. In some cases, a hierarchy of templates can be managed by the CMS, specifically where templates at a higher level of a hierarchy are composed of other templates that are at the same or lower level of templates.

Various individual components of an e-signing system and/or cooperation between components of the e-signing system can cause or enforce permitted behaviors.

The options might include policies 206. As used herein a policy or policies refers to computer-implemented code or data that serves to instruct e-signing processes to perform (or not perform) certain operations. For example, a policy might be defined to allow (or disallow) a particular behavior. As another example, a policy might be defined so as to require multi-factor authentication (e.g., using a confirmation code sent by SMS or email to a user device) before an e-signature can be applied by an e-signatory to a subject document. As another example, one or more policies might include a time to completion policy or a time window policy. In accordance with such policies, an occurrence of a first e-signature event starts a real-time clock. The time window policy is enforced such that each subsequent e-signature must be completed within the policy-specified window of time. As yet further examples, one or more envelope generation policies might require that e-signers can only be users of the same enterprise.

The embodiment of FIG. 2A depicts an on-the-fly event 228 and several processing steps that are invoked, directly or indirectly based on such an on-the-fly event 228. As shown, the on-the-fly event and corresponding processing steps take their context from an envelope 223, instructions provided within the envelope, and a subject document 225. In response to the occurrence of an e-sign request event 220, step 224 serves to prepare and send out an envelope to e-signing participants. In some cases, and as shown, the operations of step 224 are facilitated by an admin. In other cases, the operations of step 224 can be carried out completely automatically by any computer-implemented agent. In some cases, the operations of step 224—as well as the raising of the e-sign request event—can be initiated and/or carried out by a workflow. The act of raising an e-sign request event can be configured during step 201 where workflow metadata 208 and its constituent triggers 210 are processed so as to codify the aforementioned permitted behaviors.

One semantic of the term "on-the-fly" or "on-the-fly event" refers to detection and handling of e-signing events that occur after a first participant in an e-signature process has viewed at least a portion of the envelope or its constituent instructions and/or constituent documents mentioned, directly or indirectly, in the envelope. Within this semantic, it follows that step 230, which is invoked by an on-the-fly event, is able to process the received on-the-fly event even after any one or more of the participants of the e-signing process have viewed at least a portion of the envelope or its constituent instructions and/or at least a portion of the constituent documents of the envelope. In some cases, an on-the-fly event is the event of a modification of a to-be-signed subject document, which modification occurs even after any one or more of the participants of the e-signing process has viewed or e-signed the subject document. Within this semantic of an on-the-fly event, and in accordance with the disclosures herein, a subject document can be modified even after a corresponding envelope has been sent out, and the e-signing process can continue—yet without requiring administrative intervention.

The specific processing performed in step 230 depends on aspects of the received on-the-fly event as well as various then-current states or conditions of the content management system (CMS). More specifically, the processing performed in step 230 may depend on the then-current states or conditions, possibly involving states or conditions present in or inferred from content object data 222. As used herein, content object data 222 pertains to any information that refers to or derives from items stored in the collaboration system, and/or that refers to or derives from changes to items stored in the collaboration system.

As one specific case of an on-the-fly event, consider the situation where a series of blank pages were deleted from the very end of a subject document that had already been sent out for e-signature. At least inasmuch as a deletion of blank pages from the very end of a subject document are deemed to have no legally-binding effect, it would be unnecessary to restart the e-signing process. Instead, step 230 might merely advise the remaining e-signatories that the subject document had been insubstantially changed from its original version. As can now be noted, any sort of change made to a subject document or to its metadata could raise an on-the-fly event, which in turn can be processed in step 230. Additionally or alternatively, step 230 might perform its own check to see if the subject document has been altered and, if so, determine how to process the change without having to restart the e-signing process from the beginning.

Additionally or alternatively, step 230 might perform a check to see if the envelope has been altered in a manner that permits processing the alteration in an on-the-fly manner. Strictly to illustrate one such possibility, an administrator might add one or more e-signatories to the envelope and such an addition can be performed, at least potentially, on-the-fly. There are, however, certain situations such that adding additional e-signatories after sending out an envelope would not be permitted. Operations that underly the performance of step 230 can automatically determine whether or not the alteration can be processed on-the-fly.

As another specific case of an on-the-fly event, consider the situation where metadata of the CMS is used to influence progressions through a workflow and/or to influence decision making (e.g., by an administrator or by the CMS itself). In such cases, a determination is made as to whether or not the change to the metadata affects the legal status of the e-signing. If not, then that metadata change can be processed as an on-the-fly event and the e-signing process need not be restarted.

In some cases, an on-the-fly event raises the notion that a supporting document (e.g., a rider) be added to the envelope (e.g., as an exhibit or attachment). As an example, a first e-signatory of a contract might deem that a rider addendum is appropriate to add to the contract (e.g., as an exhibit or attachment). The first e-signer can add the rider to the envelope, then e-sign in a manner that advances the updated contract (i.e. now with a rider addendum) to the next e-signatories. In some embodiments, such a rider or other addendum might be drawn from a repository of templates. Some embodiments autofill field values based on information available in the CMS.

The manner in which step 230 determines how to process the change without having to restart the e-signing process from the beginning might inform step 232, which is configured to be able to access the content object data. Strictly as an example action of step 232 to perform post processing, metadata in content object data 222 might be generated or modified so as to codify that the subject document has been e-signed. Additional post processing steps might be carried out. For example, all of the participants of the e-signing process might be notified (e.g., via an email) that the e-signing process has been completed. In some cases, team members of the participants of the e-signing process might be notified as well that the e-signing process has been completed.

As another example, the e-signed document might be classified with respect to security and/or privacy considerations. As yet another example, the e-signed document might be marked to indicate a specific retention period. In some situations, a retention period is indicated in metadata, and that metadata is included in the bits of a subject document that are used to produce an authentication certificate. In such a situation, a change to a retention period would cause the subject document to be reauthenticated, yet that change to the retention period might be deemed to be a legally insubstantial change.

In some situations, it can happen that a security classification of a subject document changes in a manner that prevents a delegate from accessing the subject document (e.g., to e-sign instead of the principal). Many of such cases corresponding to a classification change can be processed on-the-fly—without having to restart the e-signing process. In this particular situation, the e-signing process can proceed without restart by merely eliminating the possibility that the delegate can e-sign instead of the principal.

In certain collaboration systems, there are many types of changes to content object data that might need to be processed so as to complete the e-signing process, yet without having to restart the e-signing process from the beginning. A selection of such types of changes to content object data that might need to be processed so as to complete the e-signing process without having to restart the e-signing process from the beginning are shown and described as pertains to FIG. 2B.

Figure 2B:
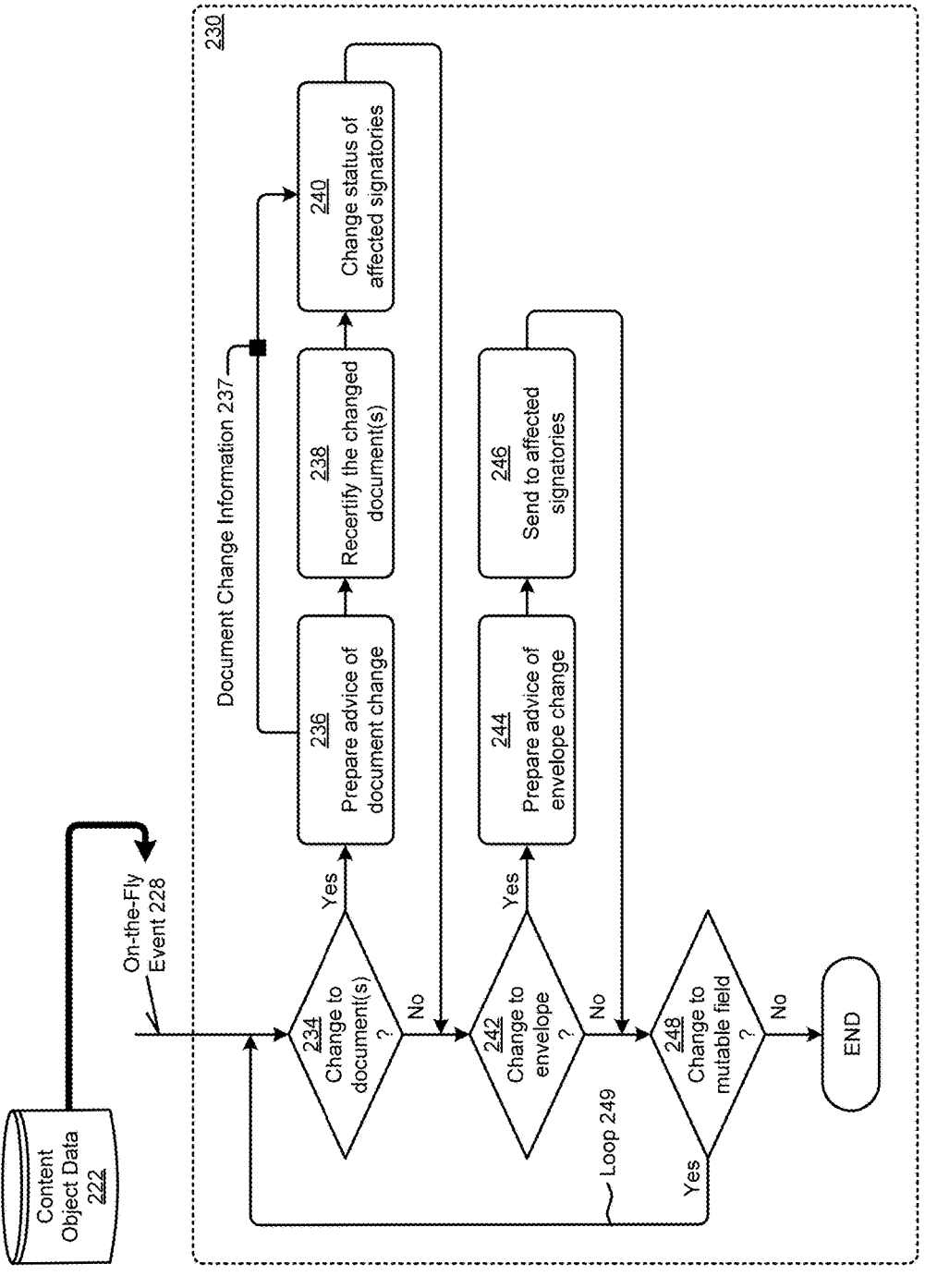
FIG. 2B illustrates an example on-the-fly event processing technique that is configured to respond to on-the-fly events by making modifications to an ongoing e-signing process, according to an embodiment.

FIG. 2B illustrates an example on-the-fly event processing technique that is configured to respond to on-the-fly events by making modifications to an ongoing e-signing process. As an option, one or more variations of on-the-fly event processing technique 2B00 or any aspect thereof may be implemented in the context of the architecture and functionality of the embodiments described herein and/or in any environment.

The figure is being presented to illustrate one possible embodiment of certain specific processing performed by step 230 in response to a detected occurrence of an on-the-fly event 228. As shown, step 230 includes several tests to determine the nature of changes that might affect the ongoing e-signature processing. Specifically, the depicted implementation of step 230 carries out (1) a test 234 to determine if there had been a change to a subject document, (2) a test 242 to determine if there had been a change to a subject envelope, and (3) a test 248 to determine if there had been a change to a form field of a subject document. Depending on the result of the test or tests (e.g., corresponding to a "Yes" branch or a "No" branch of a test), different on-the-fly processing is carried out.

In this embodiment, when is it deemed that there is a change to any one or more constituent documents of the envelope, then the "Yes" branch of test 234 is taken, and step 236 determines which e-signatories might be affected by the particular change made to the constituent documents. In some cases, it can happen that not all pages or fields of a subject document need to be e-signed by all e-signatories. For example, a change to a subordinate document (e.g., an insurance coverage rider) of a subject document might need to be e-signed only by one or more authorized e-signatories of the insurance company. In such a situation, even if there were a change to the coverage rider, and even if the insured person or entity had already e-signed the other documents of the envelope, it is possible that the on-the-fly change can be processed so as to complete the e-signing process without having to restart the e-signing process from the beginning.

To complete the e-signing process without having to restart the e-signing process from the beginning, step 238 is carried out to recertify the changed document that is the rider. This can be done by generating one or more authentication certificates that are generated based on the changed document that is the rider. Such authentication certificates can be used throughout the e-signing process so as to verify the authenticity of the document. That is, the certification can be used to verify that no changes have been made to the document since generation of the certificate.

There are a wide range of changes that could be made to a subject document, some of which would need to be reviewed by the e-signatories prior to e-signing. In some situations, an on-the-fly change is made to a subject document in a timeframe that is (1) after one or more e-signatories have e-signed, and (2) before all e-signatories have opened the envelope. In such a case, step 240 serves to update the status of the affected e-signatories. During processing involved in preparing advice of the particulars of changes that had been made to a subject document, a set of document change information 237 may be codified, and such document change information (e.g., redline version of changes, metadata changes, security labeling changes, etc.) can be provided to step 240 in a manner such that the processing of step 240 can include making a determination as to which e-signatories (or other participants) are affected by the changes that had been made to the subject document. Moreover, step 240 can serve to determine, on an e-signatory-by-signatory basis, what action (e.g., status change, repeat performance of a previously completed action, etc.) might be indicated for the system and/or e-signatory to take.

Strictly as examples, one or more e-signatories who have already e-signed might be advised that they have to review again and e-sign again. Also, the e-signatories who have not yet opened the envelope might be advised that the subject document had been changed. Such advice might include audit trail information such as who made the change, when the change was made, and possibly some information about the nature of the change. In some cases, a particular change can be classified as (a) formatting of content or presentation of content (e.g., pagination) only, (b) movement of content only within the same document—but without changing the content itself, or (c) changes made to the content itself. In some cases, changes of any sort are annotated. In some cases, a separate document shows additions and/or deletions.

As an example scenario, consider the case where an e-signatory notices a discrepancy in a contract, such as a discrepancy between two occurrences of the "closing date". Further consider the scenario where some of the participants have already e-signed by the time the discrepancy is noticed. In accordance with the herein-disclosed techniques, a redlining process notifies those e-signatories who have already e-signed to review a redline of the changes and asks those e-signatories who have already e-signed to review a redline of the changes and then re-sign the updated contract, while those e-signatories who have not yet e-signed would only see the updated (e.g., corrected) contract. In some example scenarios, an administrator who is not an e-signatory might be the person who detects the discrepancy between two occurrences of the "closing date". As such, the discrepancy can be detected asynchronously with respect to occurrences of any e-signatures on the contract. That is, the discrepancy can be detected and any change to the contract can be applied either before receipt of a first e-signature, or after receipt of any e-signature or even after all e-signers have e-signed. In yet other example scenario, an e-signatory who is not the first e-signatory to e-sign might be the person who detects the discrepancy between two occurrences of the "closing date". As such, the discrepancy can be detected asynchronously with respect to occurrences of any further e-signatures. That is, the discrepancy can be detected and any change to the contract can be applied by the second or Nth e-signatory even after receipt of a first e-signature. In such as case, those e-signatories who have already e-signed may be asked to review a redline of the changes and then re-sign the updated contract.

As a further example scenario, consider the case where an e-signatory notices a discrepancy or error on a purchase order such as the amount or such as the name of one of the e-signatories. In accordance with the herein-disclosed techniques, a redlining process asks that those e-signatories who have already e-signed to review a redline of the changes to the purchase order and to re-sign the updated purchase order, while those e-signatories who have not yet e-signed would only see the updated (e.g., corrected) purchase order.

Now, returning to the discussion of the series of tests (e.g., test 234, test 242, and test 248), it can happen that in addition to or instead of a change to a document, there might have been a detected change to the envelope. In this embodiment, when is it deemed that there is a change to any portion of the envelope, then the "Yes" branch of test 242 is taken, and step 244 serves to prepare advise of the change to the envelope so as to be able to advise the affected e-signatories (step 246) that there had been some change to the envelope, which change might influence whether or not a particular e-signatory would e-sign (or would decline to e-sign). In some cases, it can happen that fewer than all e-signatories need to be advised of the change to the envelope. For example, if a first e-signatory, "Signatory A", during his/her e-signing process, decided to add an additional email alias, then it might be deemed unnecessary to advise "Signatory A" that he/she made a change to the envelope. The other e-signatories would merely see, or able to see that "Signatory A" is now associated with the aforementioned additional email alias.

In some implementations, templates with mutable fields and/or forms with mutable fields are supported. In such cases, test 248 might be taken and, in the event that there was indeed a change to a form field, the "Yes" branch of test 248 is taken which in turn transfers control of the then-current process such that further processing can be undertaken. In this particular example flow, control is transferred so as to take loop 249.

Figure 3A:
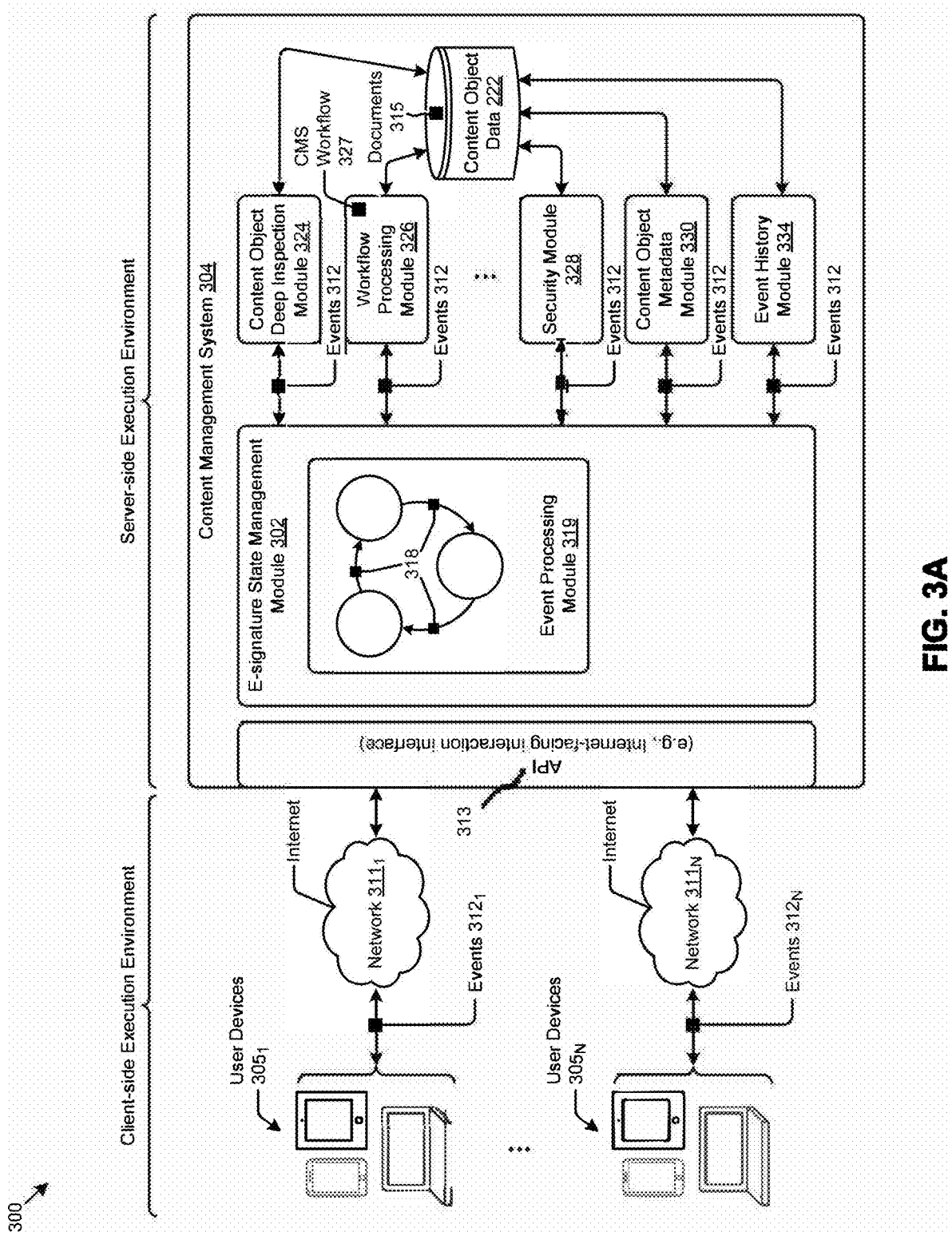
FIG. 3A shows network communications between user devices and a content management system, according to an embodiment.

FIG. 3A shows network communications between user devices and a content management system. As an option, one or more variations of e-signing system 300 or any aspect thereof may be implemented in the context of the architecture and functionality of the embodiments described herein and/or in any environment.

The network communications are carried out between user devices (i.e., user devices 305₁, . . . , user devices 305_N) and content management system 304. Any number of public or private networks or subnetworks or VPNs (e.g., network 311₁, network 311_N) can convey information (e.g., events 312₁, events 312_N) to and from the CMS. In the specific embodiment of FIG. 3A, an application programming interface (e.g., API 313) is Internet-facing so as to provide access to facilities of the CMS by one or more user devices. The Internet-facing interface is able to receive events 312 from any user device.

The foregoing API 313 is in turn able to perform some initial processing on a received event and, in turn, can convey information to e-signature state management module 302 of the CMS. More particularly the foregoing API 313 is configured to convey information to event processing module 319 of e-signature state management module 302. Referring again to content management system 304 and specifically to the e-signature state management module 302, it can be seen that the e-signature state management module 302 is a module that is situated within the logical boundary of the content management system 304. With this architecture, the executable module that constitutes all or part of the signature state management module is configured to associate e-signing metadata to one or more of the stored content objects. More specifically the executable module that constitutes all or part of the signature state management module is configured to manage e-signing metadata that applies to one or more of the stored content objects (e.g., wherein such metadata is indicative that a particular portion of the one or more of the stored content objects has been e-signed by a particular e-signatory).

The event processing module in turn interacts with any one or more of a wide range of processing modules (e.g., content object deep inspection module 324, workflow processing module 326, security module 328, content object metadata module 330, and event history module 334) which processing modules in turn access content object data 222. Content object data 222 can include content objects of any type (e.g., documents 315, photos or other images, chat or SMS exchanges, etc.). Event processing module 319 can process events 312 which, as shown, can arise from user devices and/or from modules of the CMS. In some cases, the processing of a particular event may result in raising one or more child events, which in turn may raise still other events, and so on.

As can be seen, the e-signature system is integrated into the content management system in a manner that exposes stored content objects of the CMS system to the e-signature system. Moreover, a plurality of user devices that are involved in an e-signing process can access at least some of the content objects through an electronic interface. This is different from other approaches where, instead of integrating an e-signature system into a content management system integrated e-signing system such as e-signature system 302, can respond to events over the content objects at any moment in time—even after one or more of the intended e-signatories have already e-signed. Accordingly one advance that arises from having an integrated e-signing system such as e-signature system 302, is that many types of changes can be made to a content object, and even in the face of such a change to a content object the e-signing process can continue without having to be restarted. As one example, suppose that a change was made to a content object: The content management system detects the change and then, in response to the detected change, the integrated e-signing system can be instructed to determine a set of options to address the detected change. Such operations to address the detected change go well beyond merely restarting the e-signing process. For example, one option might be to advise the e-signatories of potential conflicts corresponding to the detected change. Further, in response to the detected change, the integrated e-signing system can request that e-signatories perform steps to e-sign (or e-sign again) the updated content object version (e.g., where the updated content object version comprises the detected change).

With the foregoing degree of integration, any of a wide variety of changes to content objects can be passed into an event processing module. Moreover the event processing module of the e-signature system can comprehend a wide range of event types. Moreover, the foregoing event processing may include a particularly configured set of processing steps, and/or the foregoing event processing may include acts of data manipulation. Strictly as examples, Table 1 presents certain processing steps and certain types of data manipulation that correspond to use cases in the herein-disclosed e-signing system.

TABLE 1

| Item | Description |
| --- | --- |
| Processing Steps | Inform e-signatory/signor when they initiate an e-sign event that an edit is in progress (e.g., if an e-signor clicks in while an edit is happening, they get notified that a revision is in process and asked to wait or come back later). |
| Processing Steps | If an e-signatory has already e-signed, then inform e-signatory/signor when an edit has since happened, thus allowing them to review and re-sign, or decline to e-sign. |
| Data Manipulation | Save a to-be-signed document in a web-accessible content management system storage repository. |
| Data Manipulation | Store administrative settings to allow on-the-fly edit/sign behavior by a creator or author. |
| Data Manipulation | Create redline of changes based on textual content (or based on visual diffs). |
| Processing Steps or Tests | If, after sending an e-sign envelope, an edit begins (e.g., by a creator) on the corresponding to-be-signed document, the author of the e-sign envelope can be informed, asking if they want to use the updated document to continue the e-sign processing. |
| Processing Steps | If an e-signatory has declined to e-sign the document and the creator has been notified, the creator can make further edits to the document. An updated reference to the updated document can be made and provided (e.g., with redlines as above) such that the e-signatory/signor can again review and approve and e-sign, or decline to e-sign. |
| Processing Steps | An Edit/Advise/Sign/Decline cycle can repeat as often and as many times as needed. The saved copy of the potentially on-the-fly edited document and its envelope can be reused for ongoing e-sign events as many times as needed. |

(such as is shown), an e-signature system implemented separately from any content management system. Many advantages come to the fore in architectures where the e-signature system is integrated into the content management system in a manner that exposes a wide range of stored content objects to the e-signature system. By exposing stored content objects and corresponding metadata to the e-signature system, changes can be made to any one or more of the content objects that are involved in an e-signing process. This offers advantages that cover scenarios where legacy e-signing systems fail. Strictly as one example, an FIG. 3A depicts a client-side execution environment and a server-side execution environment, which environments are organized to implement aspects of a client-server architecture. The depiction of FIG. 3A is merely to illustrate one such client-server architecture that is used when the CMS is interacting with user devices. Additionally or alternatively, the CMS can be configured to interact with computing equipment (e.g., servers) and software (e.g., third-party applications). In fact, there is a wide range of use cases where a third-party application receives or raises e-signing events from or into the content management system. One possible implementation of an interface between third-party applications and a CMS is shown and described as pertains to FIG. 3B.

Figure 3B:
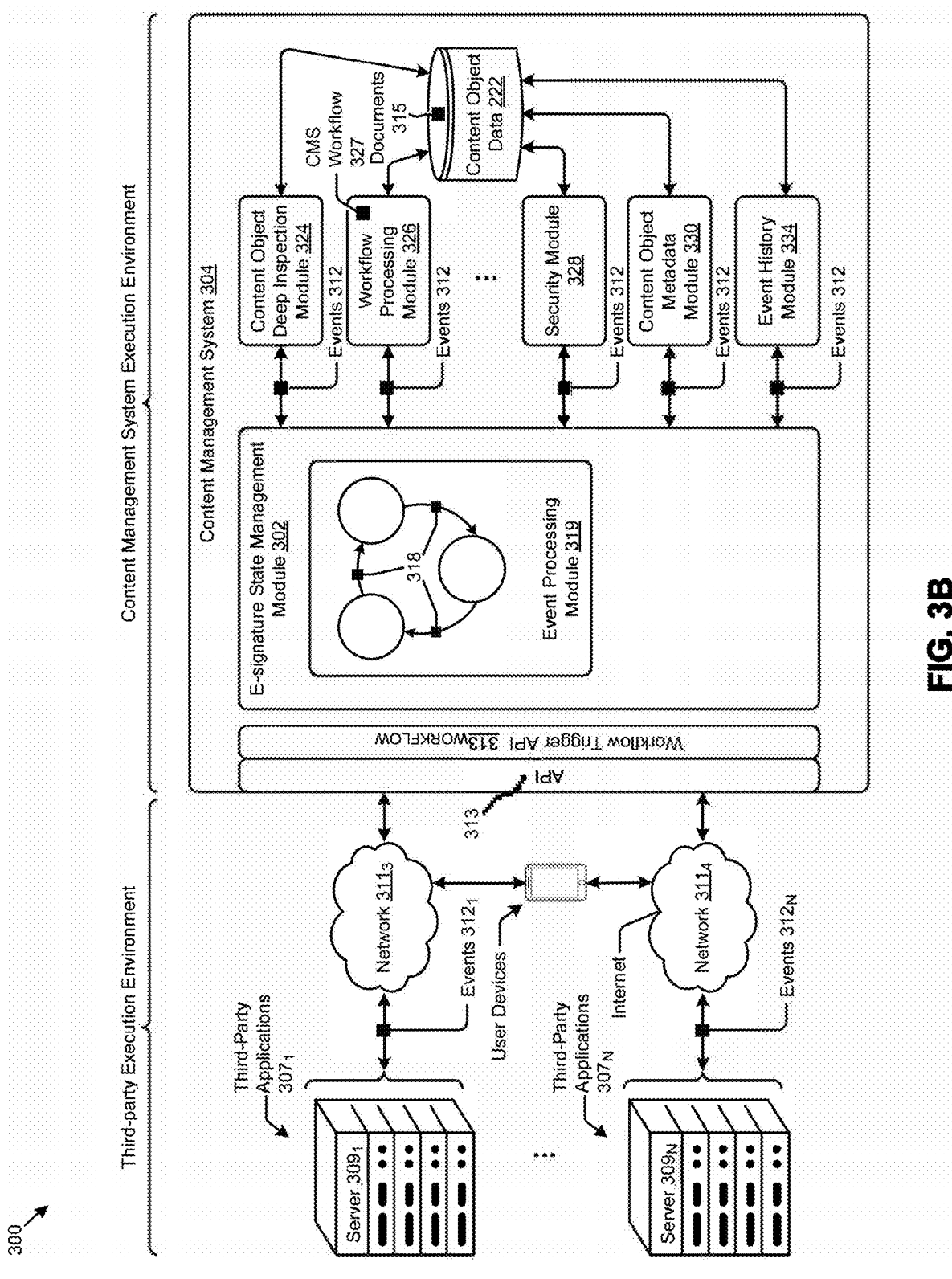
FIG. 3B shows network communications between third-party applications and a content management system, according to an embodiment.

FIG. 3B shows network communications between third-party applications and a content management system. As an option, one or more variations of e-signing system 300 or any aspect thereof may be implemented in the context of the architecture and functionality of the embodiments described herein and/or in any environment.

The figure is being presented to illustrate myriad possible scenarios that are facilitated when one or more third-party applications (i.e., third-party applications 307$_1$, . . . , third-party applications 307$_N$) receive or raise e-signing events when interacting with the CMS. As shown, any one or more servers (e.g., server 309$_1$, . . . , server 309$_N$) can host any number of third-party applications, which in turn can receive or raise e-signing events that occur in the e-signing system. More particularly, any one or more third-party applications can be configured to carry out document processing that corresponds to a particular workflow, which in turn might correspond to a particular commercial endeavor. Still more particularly, any one or more third-party applications can be configured to access workflow trigger API 313$_{WORKFLOW}$ to initiate document processing that corresponds to a particular workflow.

Strictly as one example scenario, consider a document processing workflow undertaken during a real estate transaction. Specifically, during the course of concluding the transaction, a seller's agent, possibly in coordination with the buyer's agent, completes and saves a contract into the CMS. An administrator of the buyer's agent then and sends out an envelope for buyer and seller e-signatures. The buyer's agent notices an error and fixes it in the contract stored in the CMS. The event of making a change to the contract (e.g., the event of the buyer's agent saving a modified/fixed copy of the contract stored in the CMS) triggers an on-the-fly event. Rather than requiring a restart of the e-signing process, the e-signatories are advised of the availability of the modified/fixed version of the contract. Thus, in accordance with the disclosures herein, not only can administrative procedures be obviated, but also a person other than the e-signatories (e.g., seller and buyer) can cause the on-the-fly processing to commence.

As another example scenario, consider a law firm employee (e.g., a paralegal) who sends out a declaration to the inventors for their e-signatures. Further consider the scenario where a different law firm employee notices an error in the spelling of one of the inventors names on the declaration, and then makes a correction in the declaration. This triggers on-the-fly processing. In accordance with the disclosures herein, not only can administrative procedures be obviated, but also a person other than the e-signatories (e.g., the inventors) can cause the on-the-fly processing to commence.

As yet another example scenario of on-the-fly e-signature processing, consider the situation where an insurance agent (who is a CMS user) fills out a claim form, saves it to the CMS and then sends out an e-sign request to obtain insurance adjustor and claimant e-signatures. Then consider that the insurance adjustor (who is also a CMS user) makes a change to a form field of the claim form and stores the modified claim form in the CMS. The saving of the modified claim form would trigger an on-the-fly event, which in turn would trigger on-the-fly event processing in accordance with the disclosures herein. Thus, a person other than the e-sign request originator (i.e., the insurance agent) causes on-the-fly processing to commence.

As a still further example scenario of on-the-fly e-signature processing, consider the situation where a human resources (HR) manager oversees preparation and e-signing of an offer letter by and between a department manager and a candidate. It might happen that the human resources manager, even though not an e-signatory, notices and corrects an error in the offer letter. In this case, the human resources manager is a person other than the e-sign request originator, yet the human resources manager is the person who causes on-the-fly processing to commence.

In some cases, information that is used to populate a form field is provided by a third-party application. For example, many or most or sometimes all of the fields of the aforementioned claim form can be populated by a third-party application. In the claim form case, many or most or all of the fields of the aforementioned claim form can be populated by a third-party application, where the third-party application is provisioned by the insurance underwriter. In some cases, form fields (e.g., contract values, contact names, delegates, addresses, etc.) can be auto-populated by such a third-party application under computer control, and without requiring human intervention.

Any of the foregoing scenarios, plus other scenarios not specifically described in the foregoing scenarios, can be facilitated through use of third-party applications. As shown, any such third-party applications can be implemented in one or more computer servers (e.g., the shown server 309$_1$, . . . , and/or server 309$_N$), which computer servers are interfaced with the content management system 304. In some cases, a CMS workflow 327 that operates within the network domain of the CMS can be integrated with (e.g., extended) a workflow of a third-party application that operates within a network domain other than the network domain of the CMS. Communication between such domains can be accommodated via, for example, an event communication over network 311$_3$ and/or network 311$_4$.

Further details regarding general approaches to third-party integrations are described in U.S. Patent Application Publication No. US 2021-0191794 A1 titled "EXTENSIBLE WORKFLOW ACCESS" published on Jun. 24, 2021, which is hereby incorporated by reference in its entirety.

Figure 3C:
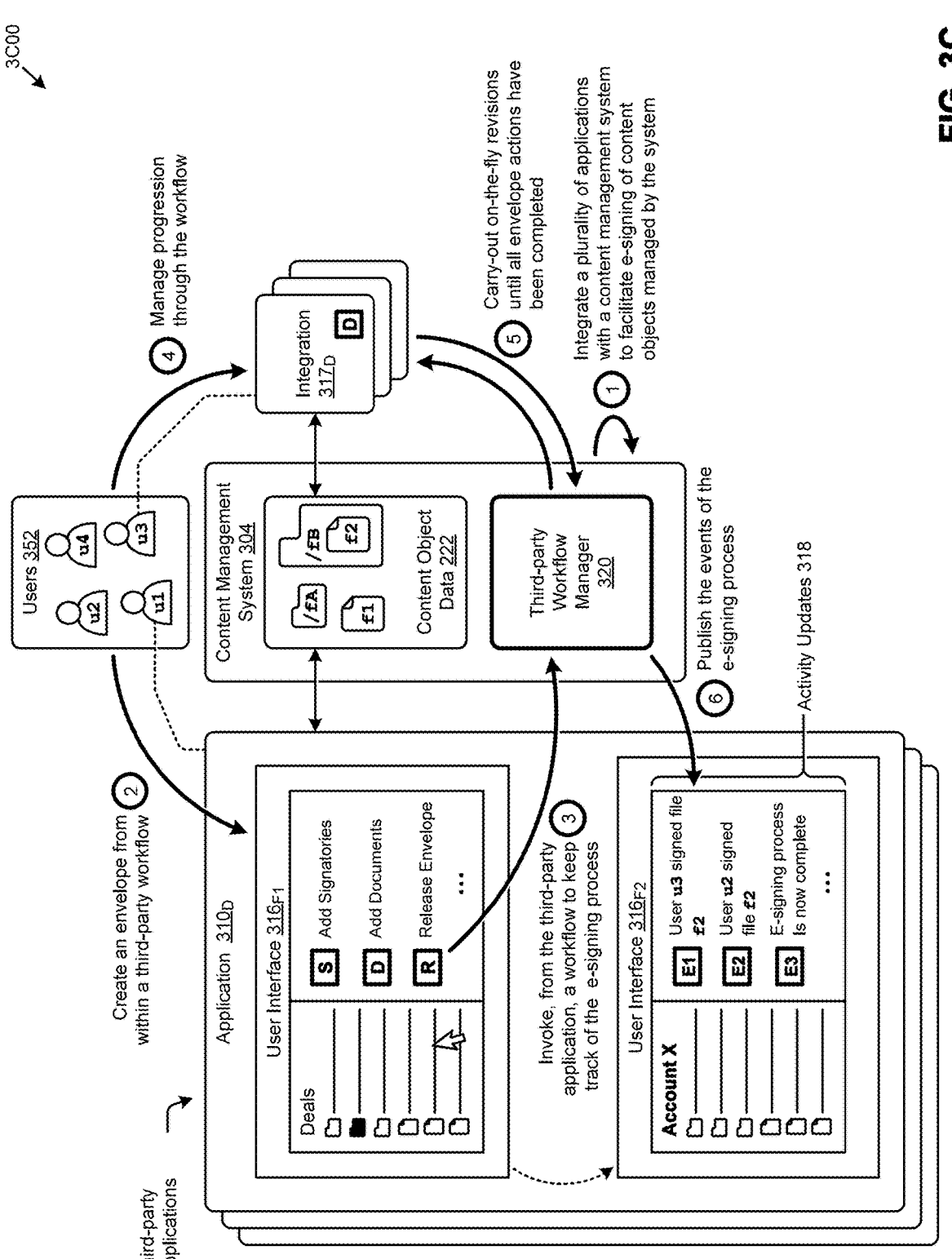
FIG. 3C depicts e-sign event handling techniques involving third-party applications that are integrated with a content management system, according to an embodiment.

FIG. 3C depicts e-sign event handling techniques 3C00 involving third-party applications that are integrated with a content management system. This figure is being presented to illustrate how a user can create an envelope and monitor completion through a third-party application.

As shown, third-party applications are integrated with the content management system 304 to constitute an e-signing ecosystem. A third-party workflow manager 320 is integrated with the content management system. The third-party workflow manager 320 is configured so as to (1) respond to events raised by operation of any of the third-party applications, (2) respond to events raised when a user or users e-sign a document, and (3) raise events and/or emit data items that are ingested by the third-party applications.

In this example, the content management system 304 and a particular third-party application 310$_D$ interact so as to start and complete e-signing of a contract. A plurality of applications are integrated with the CMS (operation 1) such that certain functions performed at or by the third-party application notify or otherwise interact with the third-party workflow manager 320. More specifically, steps and events that pertain to the flow of an e-signing process are integrated with the third-party workflow manager. As such, (1) when the third-party workflow manager receives indication of a particular event as raised by a third-party application, it moves the processing to next steps in the workflow, and (2) when there is a next event to be raised in response to the progression of the workflow, the third-party workflow manager raises such an event. Such a raised event might derive from an action taken by one or more users 352 (e.g., changes made or actions taken over the content object data 222), or such a raised event might derive as a result of operation of the third-party application, or such a raised event might be an event emitted by the CMS, etc.

In one possible scenario, a user creates (e.g., using user interface $316_{F1}$) an envelope from within a third-party workflow (operation 2). That act raises an event (e.g., an envelope creation event) which is received by the third-party workflow manager. The third-party workflow manager in turn invokes a portion of an e-signing workflow to keep track of the e-signing process (operation 3). One or more agents (e.g., the shown third-party integration $317_D$) manage progression through the e-signing workflow (operation 4). In some progressions through the e-signing workflow, in particular in situations where an on-the-fly event is detected, the agent carries out or otherwise facilitates on-the-fly processing until all envelope actions have been completed (operation 5). In some embodiments, completion of any one or more of the envelope actions can be facilitated by the aforementioned agent. More specifically, the agent can facilitate (e.g., using user interface $316_{F1}$, and/or using user interface $316_{F2}$) completion of any one or more of the envelope actions by providing user prompts and/or by auto-filling form fields.

As the e-signing workflow progresses, events are raised and envelope actions are completed. An abstract of the facts of event occurrences or action completions (e.g., the shown activity updates 318) is published to the third-party application (operation 6). This is shown in the sample depiction within user interface $316_{F2}$.

To illustrate, consider a scenario where a third-party application manages business deal flows. Further, consider the acts involved in managing formation and conclusion of a purchase contract. In this scenario, various data from within the third-party application (e.g., the parties involved, the amount contemplated in the purchase, an itemized list of items to be procured, etc.) is sent into the third-party workflow manager 320 along with some indication of a particular template to use with this scenario. In exemplary cases, the template to be used is selected by or in conjunction with the content management system. The template to be used is selected from among content object data 222 and passed to third-party application $310_D$. By comporting various data from within the third-party application to fields of the template, third-party application $310_D$ is able produce a ready-to-be-signed purchase contract, which is associated with an envelope. The envelope then is released, which causes an e-signing workflow to be initiated (operation 4).

In some cases, one or more of the e-signatories and/or one or more other computing agents might raise an on-the-fly event, which in turn might cause one or more on-the-fly editing and review sessions to be invoked. When the third-party workflow manager 320 determines that any one or more of the envelope actions are deemed to have been accomplished (operation 5), then the third-party integration $317_D$ and or the third-party application $310_D$ are notified. When all of the envelope actions have been deemed to have been accomplished (e.g., all e-signatories have e-signed) then the third-party integration $317_D$ and or the third-party application $310_D$ are notified that the e-signing workflow has completed. In some cases some of the e-signatories might have declined to e-sign, in which case the third-party integration $317_D$ and or the third-party application $310_D$ are notified that the e-signing workflow has completed with exceptions. Representative ones of the e-signing workflow events are published to the third-party application (step 6).

In some situations, the act of progressing through the e-signing workflow might involve collecting data from two or more third-party applications. Strictly as one example, it might happen that, based on events encountered during carrying out of the e-signing workflow, and/or based on the presence and coding of template fields, a second or Nth third-party application is invoked. This can happen, when additional data (e.g., additional data beyond that provided by the first third-party application) and/or additional attachments are needed for completion of the e-signing process. The specific type of additional data and/or additional attachments (e.g., a photo image, a design document, a CAD specification, etc.) depends, at least in part, on the presence and coding of template fields that raise a demand for additional information to be retrieved from additional third-party applications. In some situations, the inclusion of data from additional third-party applications and/or the retrieval of additional attachments from third-party applications might cause the workflow manager to create another envelope, and/or another e-signable document, and/or an e-signable rider, and/or an annotation. An annotation can be added to any object involved in the e-signing process. In some cases, the addition of an annotation to an object involved in the e-signing process causes a recertification of all or parts of the envelope. In other cases the addition of an annotation to an object involved in the e-signing process can be handled as an ephemeral change that does not raise a recertification event.

Envelope Readiness

In some embodiments the e-signing workflow is configured to be able to gather inputs from multiple sources (e.g., multiple third-party applications). For example, an e-signing workflow might need to gather first information from Sales-Force, second information from Workday, and third information from one or more of the users 352. Such gathering might be performed sequentially, or such input might be gathered from the multiple third-party applications in parallel. In exemplary embodiments, information gathered from any one or more of the multiple sources might include retrieval of files and/or metadata and or file contents drawn from content object data 222.

Gathering of information can be pursued in a chained manner. For instance, content management system 304, possibly in conjunction with the shown third-party workflow, upon noticing the existence of a file (e.g., the shown file "f3") in a folder (e.g., the shown folder "fB"), might enter a pending state of the e-signing workflow so as to wait for a message from SalesForce, which message indicates purchase contract details. Then, upon moving out of the pending state to a next chained action, the workflow could ask the user for information (e.g., to identify the deal manager, to inquire if the user wants to initiate the e-signing process immediately, to inquire if there is a specific date associated with any particular event or events contemplated within the e-signing process, etc.).

Figure 4A:
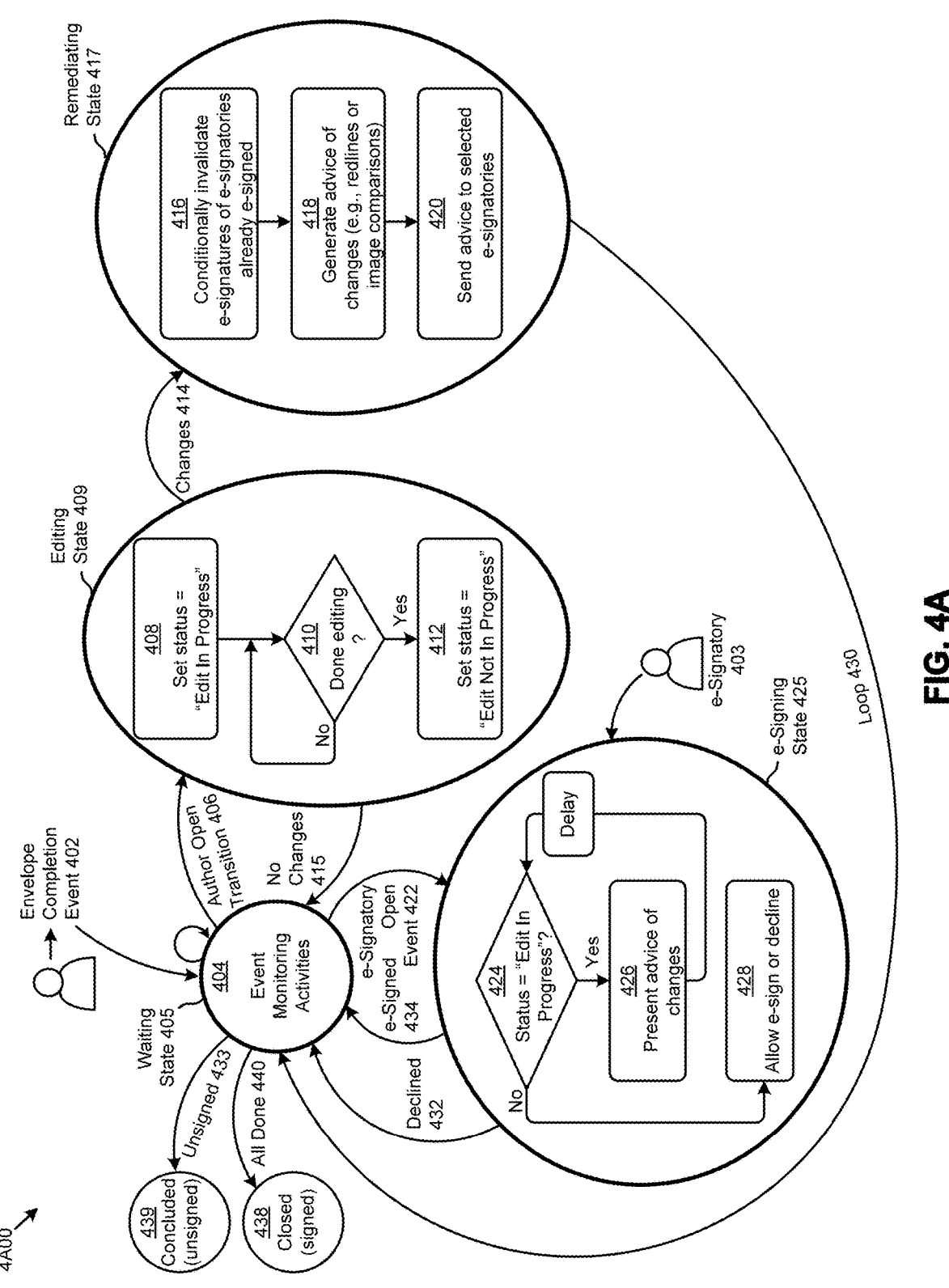
FIG. 4A is a state chart that depicts on-the-fly change handling techniques that are used in systems that detect on-the-fly events and perform on-the-fly remediation during an e-signing process, according to an embodiment.

FIG. 4A is a state chart that depicts on-the-fly change handling techniques that are used in systems that detect on-the-fly events and perform on-the-fly remediation during an e-signing process. As an option, one or more variations of on-the-fly change handling techniques 4A00 or any aspect thereof may be implemented in the context of the architecture and functionality of the embodiments described herein and/or in any environment.

As shown, the figure includes a depiction of transitions between a waiting state 405, an editing state 409, a remediating state 417, and an e-signing state 425. Each of the particular states can be entered into from other states, and each of the particular states can enter into another state based on outcomes of processing that are undertaken in a particular state.

In this example embodiment, the waiting state 405 is initially entered upon an envelope completion event 402. Completion of an envelope can be accomplished in many ways. For example, in one implementation, an envelope might be created by an administrator and saved. The act of saving can serve as an envelope completion event. In another implementation, the act of sending an email to one or more e-signatories (or other participants in the e-sign process) can serve as an envelope completion event. In any such cases, waiting state 405 is entered. In a trivial case, the waiting state 405 is re-entered repeatedly as one or more e-signatories (e.g., e-signatory 403) e-signs or declines to e-sign. In this trivial case, the waiting state can transition (e.g., via the transition labeled as all done 440) into a closed state 438 when it is deemed that the e-signing process complete. Alternatively, the waiting state can transition (e.g., via the transition labeled as unsigned 433) into a concluded state 439 when it is deemed that all e-signatories have reviewed the documents, but at least one e-signatory declined to e-sign.

There are other ways for the waiting state 405 to transition. Specifically, and as shown, one path to exit from the event monitoring activities 404 occurs when an author opens a subject document (shown as author open transition 406). This state transition leads to the editing state, in which state a status flag value that is associated with the semantics of "Edit in Progress" is set (step 408). This flag is used in other states of the system (e.g., in the shown e-signing state 425). The flag remains set to carry the semantics of "Edit in Progress" until such time as the editing is at least provisionally deemed to be "Done" (e.g., at the "Yes" branch of decision 410), at which time, and if the editing is indeed done, then the "Yes" branch of decision 410 is taken and a status flag value that is associated with the semantics of "Edit Not in Progress" is set (step 412). In some cases there might be a significant amount of time that transpires during editing. As such, the "No" branch of decision 410 might be taken repeatedly, at least until such time as the editing is deemed to be completed, at which time the "Yes" branch of decision 410 is taken. During the period of time that transpires during editing, the aforementioned status flag might be checked (e.g., during processing within e-signing state 425).

The editing state 409 can exit via a transition path when there are changes (e.g., via transition path 414), or the editing state 409 can exit via a different transition path when there are no changes (e.g., via the "No Changes" path 415). In the former case, the transition path moves to the remediating state 417. The remediating state includes processing that conditionally invalidates e-signature of those e-signatories who have already e-signed (step 416) and generates advice of the change(s) (step 418). In at least some of the herein-disclosed example embodiments, generation of the advice of the change(s) includes analyzing at least some differences between previous contents of the document(s) to be e-signed (e.g., before the change) and the changed contents of the documents(s) to be e-signed (e.g., after the change had been made).

At step 420, the generated advice is communicated to selected e-signatories (step 420). In some cases, the advice that is generated and communicated to selected e-signatories includes results of the redline processing. Such redline processing can convey changes using proofreaders markings to text or revisions markup to images.

The remediating state 417 exits via the transition shown as loop 430, which transition goes into the waiting state 405. The waiting state in turn can recognize that an e-signatory has opened a document corresponding to the envelope. Such a document or envelope opening event (e.g., the shown e-signatory open event 422) and corresponding transition into the e-signing state 425 serves to initiate processes that (1) check if there is an editing session currently in progress (decision 424), (2) advise the e-signatory of any changes that might have occurred (e.g., since the last time the particular e-signatory has seen the document(s) or envelope (step 426), and (3) allow the e-signatory to e-sign or decline to e-sign (step 428) based on the e-signatory's consideration of the advice. In some situations, advice of changes that might have occurred since the last time that the particular e-signatory has seen the document(s) or envelope are provided via one or more emitted messages and/or email messages, and/or user interface notifications (step 426).

In some implementations, the e-signatory is required to acknowledge receipt of the notification and/or consideration of the particular advice. An e-signatory can acknowledge receipt of the notification and/or consideration of the particular advice by replying to the SMS, and/or by replying to an email notification, and/or by clicking on an acknowledgement widget in a user interface.

The foregoing handles the case where there a change to the document(s) or envelope has completed, however there are situations when a change to the document(s) or envelope is in process. To handle this case, decision 424 is configured with a "No" branch such that if there is not an editing session in progress (e.g., there is no imminent change) then processing can be steered to allow the e-signatory 403 to e-sign or explicitly decline to e-sign. Decision 424 is able to detect whether or not a change or potential change is in progress is by checking the status flag that is managed by the processing within editing state 409. In situations where the status flag indicates that there is currently an edit in progress, the processing can loop repeatedly (e.g., based on event detection, or based on polling) between decision 424 and step 426, possibly with a then-current calculated delay. In some cases, conditions that are detectable during a looping session (e.g., between step 426 and decision 424) can be acted upon, or the looping session can be temporarily suspended and/or aborted and the e-signing state 425 can be re-entered at a later moment in time.

Strictly as examples: (1) during a looping session, one e-signatory can be editing the subject document while other e-signatories can see changes being applied to the document as it is being edited; (2) the looping can be suspended until such time as the document is marked as "good" (e.g., by the editor, or by an envelope administrator, or by any other sufficiently credentialed participant in the e-signing process); (3) the looping can be suspended during the period between when a subject document is explicitly unlocked (e.g., by an administrator, so as to allow changes) until the subject document is relocked (e.g., once the changes are deemed to have been entered); (4) the looping session can be suspended and/or aborted when it is detected that a user (e.g., an envelope administrator) has reinitiated the same e-sign request; and (5) during a looping session, any collaborator over the subject document or its attachments can see the changes being applied to the document, even as it is being edited.

Now, assuming that the e-signatory, at some point in time, reaches step 428, then the e-signing state can be exited via the declined transition 432 or via the e-signed transition 434. In either case, the transition takes processing back to the waiting state 405.

When the waiting state 405 is entered, the event monitoring activities of the waiting state detect that the document (s) have been e-signed (or declined). The event monitoring activities of the waiting state can further detect whether or not all e-signatories have either e-signed or declined to e-sign. Accordingly, the waiting state can exit via the unsigned transition 433 (when fewer than all e-signatories have e-signed) or the waiting state can exit via the "All Done" transition 440.

Now, returning to the discussion of the processing within the remediating state 417, and specifically referring the processing involved to generate advice of changes (step 418), it happens that different types of changes demand different types of remediation, including taking different remediation actions based on the nature of the change and/or based on characteristics of the e-signatories. Various change handling techniques are shown and described as pertains to FIG. 4B.

FIG. 4B is a flowchart that shows a change handling technique as used in systems that detect on-the-fly events and perform on-the-fly remediation during an e-signing process. As an option, one or more variations of change handling technique 4B00 or any aspect thereof may be implemented in the context of the architecture and functionality of the embodiments described herein and/or in any environment.

The shown flow is merely one possible implementation of step 418 of FIG. 4A. In addition to presenting such a possible implementation, the figure is being presented to illustrate examples of how ephemeral annotations can be added to a to-be e-signed document.

The FOR EACH loop of the shown change handling technique 4B00 includes (1) a step for determining how a change should be shown to the participants of the e-signing process (step 442), a step to determine the impact of the change (step 444), a step for remediating conflicts that arise when considering the nature and/or impact of the change with respect to other changes (step 445), a step for preparing a redline (step 446), a step for adding one or more ephemeral annotations corresponding to a particular change (step 448), and a step for preparing an abstract of the change (step 449).

The shown loop iterates over each detected change. In each iteration pertaining to a particular detected change, step 442 serves to determine a method to handle the change. In some embodiments, there is a particular set of methods that pertain to changes to the envelope, whereas there is a different set of methods that pertain to changes to the subject document or CMS metadata. In some embodiments, a rulebase 441 informs determination processing (step 442). Strictly as an example, a rule (e.g., rule $443_1$, rule $443_2$, rule $443_3$) might specify a mapping (e.g., a one-to-one mapping) between a particular change or change type and a corresponding method to handle such a change. In some cases, the determination processing of step 442 includes consideration of the object type over which the change had been made. As such, the object type can influence determination processing of step 442. Any one or more of the rules of the rulebase can include the object type as a parameter or parameter value that is used in evaluating rules. Moreover, any one or more of the rules of the rulebase can define methods that perform operations pertaining to determination of the impact of a change and/or in determination of steps to take as pertaining to conflict remediation.

As shown, constituents of rulebase 441 are used to remediate conflicts that arise when considering one change with respect to other changes. In some cases, a rule encodes priority semantics such that a change made to a particular portion of a document by one e-signer can be overridden by a change made to the same particular portion of the same document by a different e-signer.

In some cases, upon determining the impact of the change (step 444), and after considering how to remediate conflicts (step 445), a comparison between the pre-modification version of a content object and the modified version of the same content object is made, possibly resulting in preparation of a redline document (step 446). There can be many tools that are each applicable to a particular type of content object. Some tools are more applicable than others. As such, heuristics can be used to identify an applicable or preferred comparison tool to address the detected change. Once such an applicable comparison tool to address the detected change has been selected, then output(s) of the comparison tool as applied to the detected change are used to generate an indication (e.g., a redline document) of additions and deletions that had been made as between the pre-modification version of the content object and the modified version of the same content object. The outputs of the comparison tool (e.g., the redline document) can be associated with the subject document by associating metadata and metadata value to the subject document.

In some cases the comparison tool outputs an abstract of the identified changes, and that abstract can be used, in whole or in part, to generate an ephemeral annotation. Step 448 serves to apply an ephemeral annotation to the subject document. As used herein, an ephemeral annotation refers to an addition to a subject document, but which addition is not actually a part of the subject document. Using any known technique (e.g., using an index into an HTML document, or using a paragraph indicator or sentence indicator or character count indicator in a text document, etc.), an annotation can be associated with any document and/or any particular location within a document. As used herein, adding or deleting an ephemeral annotation to/from a subject document does not change the bits that are used to certify the authenticity of the subject document itself. As such, if a particular authentication certificate had been produced on the subject document, the addition or removal of an annotation does not invalidate that particular authentication certificate.

On the other hand, it is possible in some embodiments for a notation (e.g., akin to a blueline revision) to be made to the subject document, which notation does change the bits of the document itself. As such, if a particular authentication certificate had been produced on the subject document, the addition or removal of a notation would invalidate the previously generated authentication certificate, in which case, if the person making the notation is the first e-signer, then a new certificate can be generated and thereafter used to authenticate the document for subsequent e-signers. Any of the aforementioned certificates can be prepared or owned by any of the participants or the juristic entity (e.g., company, enterprise, supplier, etc.) to which any particular participant is associated.

There may be a plurality of mechanisms for determining the impact of the change. Moreover, there may be a plurality of mechanisms for remediating a change, and/or for presenting information pertaining to the change, to e-signatories and/or others involved in the e-signing process. As such, some means for detecting the then-current conditions and then selecting a remediation tool based on those then-current conditions is needed.

Figure 4C:
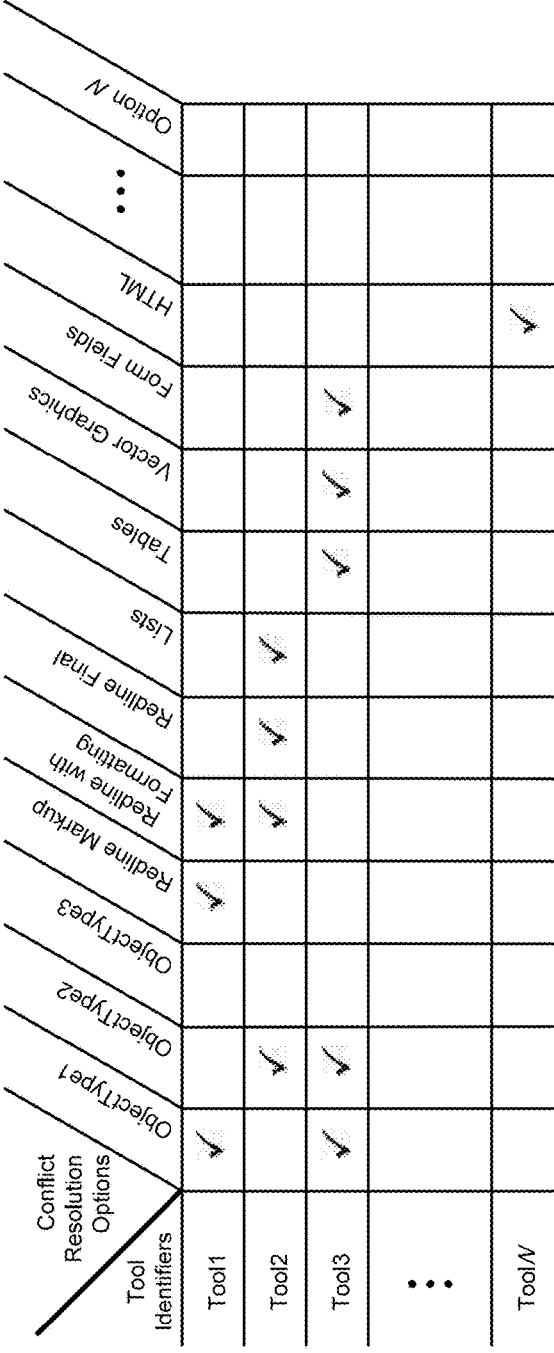
FIG. 4C presents a remediation tool selection matrix as used in systems that detect on-the-fly events and perform on-the-fly remediation during an e-signing process, according to an embodiment.

FIG. 4C presents a remediation tool selection matrix 4C00 as used in systems that detect on-the-fly events and perform on-the-fly remediation during an e-signing process. As an option, one or more variations of tool capability matrix 4C00 or any aspect thereof may be implemented in the context of the architecture and functionality of the embodiments described herein. Also, the tool capability matrix or any aspect thereof may be implemented in any environment.

The tool capability matrix can be used in conjunction with techniques that select a tool or based on any then-current conditions. As shown, the matrix includes a set of tools (see the leftmost column showing tool identifiers), and each tool of the set of tools is associated with a set of native remediation capabilities (e.g., conflict resolution options, a tool option, a tool add-in, etc.). Strictly as one example, the tool identified as "Tool1" can be used with objects of type "ObjectType1", as well as the built-in (e.g., native) tool conflict resolution options of "Redline Markup" and "Redline with Formatting". The tool capability matrix can be used in processing that determines a set of remediation tool options to address a range of actual or potential modification conflicts. In some cases, the remediation tool options comprise remediation tool options that are natively-supported within the subject editing tool. In other situations the remediation tool options comprise tool options that are enabled by plugins or scripts that interface through natively-supported application programming interfaces and/or I/O (input/output) ports provided by the subject editing tool.

As shown, the tools and tool options are not limited to office-type documents (e.g., word documents, spreadsheets, presentations, etc.). Specifically, and as shown, the aforementioned techniques that recommend conflict resolution tools for use in shared-object conflict remediation can be applied to any type of object. The shown "ToolN" exemplifies a tool and tool options that might be used when the shared object is HTML code.

In various embodiments, selection of one or more remediation tools can be based on remediation rules. Strictly as one example, a remediation rule might pertain to a particular object type (e.g., a .DOC file, or an .XLS file) or a particular tool (e.g., WORD, EXCEL, etc.), or might pertain to a particular type of conflict, or might pertain to a particular type of resolution. As an example of a particular type of resolution, a conflict handler can select a "Redline Markup" remediation capability and/or a "Redline with Formatting" remediation capability and/or a "Redline Final" remediation capability. When there are multiple remediation capabilities possible, a list of possible remediation capabilities can be presented to the user so the user can indicate a preference.

Further details regarding general approaches selecting and deploying remediation tools are described in U.S. Pat. No. 10,740,297 titled "ADAPTIVE TOOL SELECTION FOR CONFLICT RESOLUTION IN A MULTI-SESSION COLLABORATION SETTING" issued on Aug. 11, 2020, which is hereby incorporated by reference in its entirety.

Various other mechanisms for preparing advice of document changes are possible. Moreover the scope of allowed behaviors, including allowed (or disallowed) uses of annotations, can be established a priori in settings that inform how on-the-fly e-signature processing is carried out. One technique to inform how a protocol for on-the-fly e-signature processing is to be carried out is shown and described as pertains to FIG. 5A and FIG. 5B.

Figures 5A, 5B:
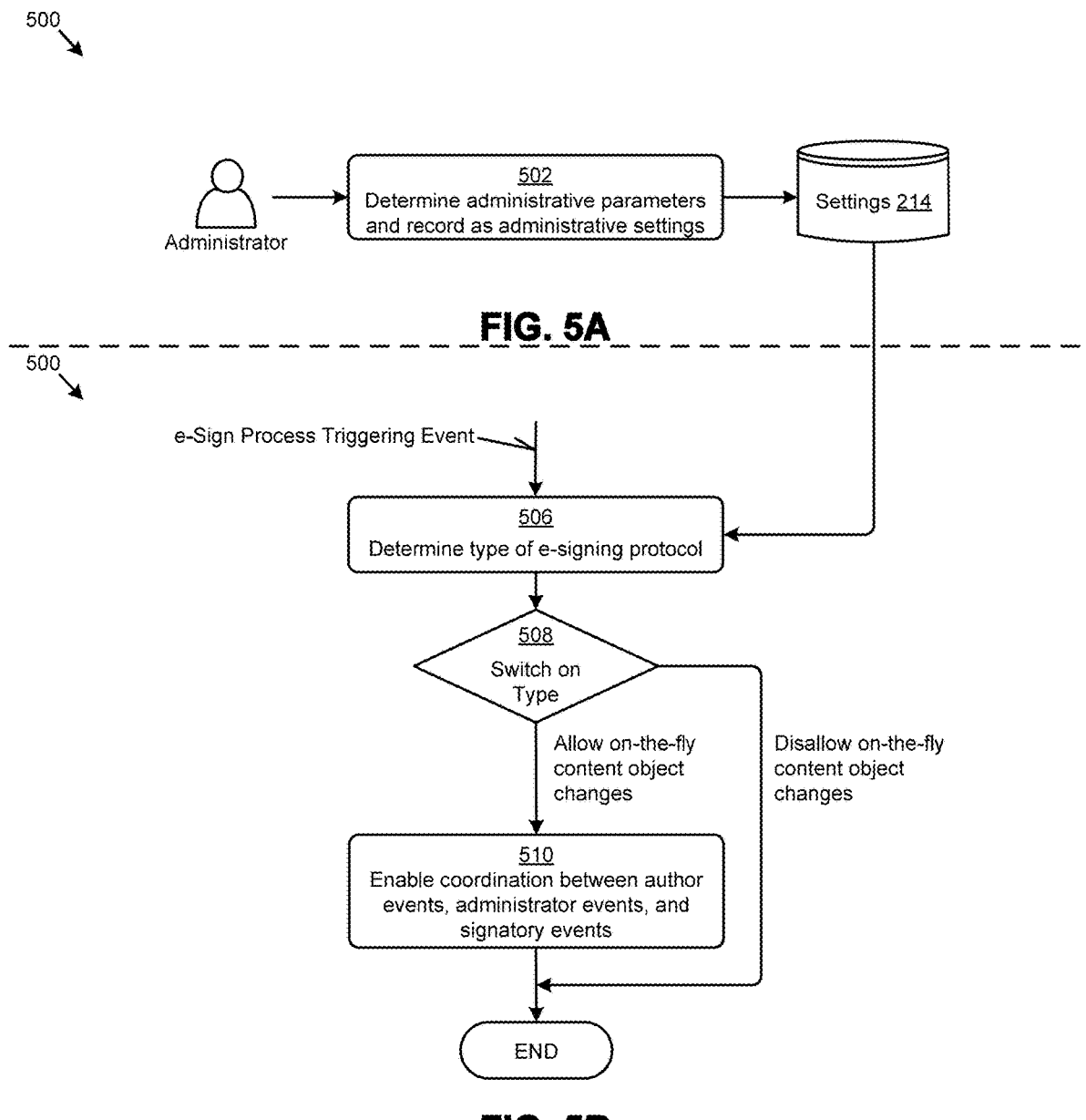
FIG. 5A and FIG. 5B depict administrative parameter handling techniques as used in systems that are configured to detect and process on-the-fly events during an e-signing process, according to an embodiment.

FIG. 5A and FIG. 5B depict administrative parameter handling techniques 500 as used in systems that are configured to detect and process on-the-fly events during an e-signing process. As an option, one or more variations of administrative parameter handling techniques or any aspect thereof may be implemented in the context of the architecture and functionality of the embodiments described herein and/or in any environment.

As shown in FIG. 5A, an administrator can interact (e.g., via a configuration GUI) with a CMS so as to determine administrative parameters 502 and save the determined administrative parameters as settings 214. Those settings in turn can be used during e-sign processing (e.g., when processing e-sign process triggering events) so as to allow or disallow certain behaviors.

In this particular embodiment, determination step 506 of FIG. 5B is entered upon occurrence of an e-sign process triggering event. A determination is made based on the e-signing protocol and/or permissions granted in the settings. Once such a determination is made, switch 508 is entered to classify how the event should be processed. In exemplary embodiments, switch 508 determines that on-the-fly content object changes are supported, and processing progresses to step 510, whereupon the e-signing system coordinates events that are raised by any one or more of administrator events, e-signatory events, and/or events that are raised by participants in the e-sign process who are neither e-signatories nor administrators.

Figure 6:
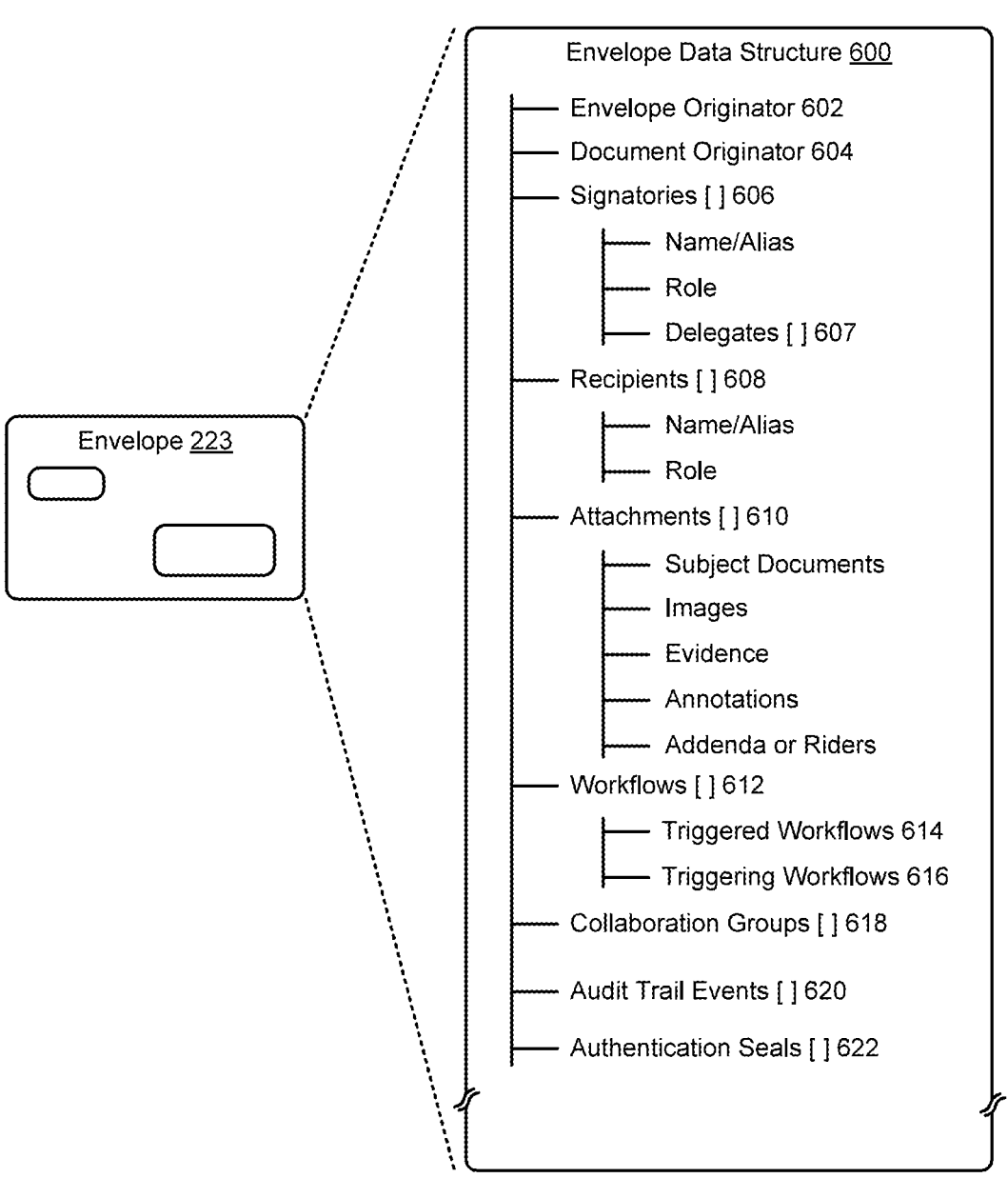
FIG. 6 shows an example envelope data structure that can be used in systems that detect and process on-the-fly events during an e-signing process, according to an embodiment.

FIG. 6 shows an example envelope data structure that can be used in systems that detect and process on-the-fly events during an e-signing process. As an option, one or more variations of envelope data structure 600 or any aspect thereof may be implemented in the context of the architecture and functionality of the embodiments described herein and/or in any environment.

As shown, the envelope data structure includes an indication of the user who is the envelope originator 602, an indication of the user who is the document originator 604 and an array of e-signatories 606. In some cases, the array of e-signatories 606 may include only a single e-signatory. This can happen, for example, when a document is self-signed. There are many scenarios where a document is self-signed. Strictly as an illustrative example, consider the case of an offer letter to an employment candidate, where the offer letter is prepared by an HR professional and where the act of e-signing the offer letter by the candidate is merely to acknowledge the candidate's receipt of the offer letter.

In other cases, the array of e-signatories 606 may include not only multiple e-signatories, but also one or more delegates 607 who are considered as alternate or secondary e-signatories. In the event that a primary e-signatory is unavailable, then a delegate can be selected in his/her stead. In some cases, a delegate might not initially have access rights to the attachments referenced in the envelope. In this situation, the delegate might be granted temporary access to such attachments. For example, a delegate might be granted document access privileges for a time period that begins when the envelope is created and ends when the e-signing process has completed.

As heretofore indicated, there are many situations where participants of the e-signing process are not e-signatories. As such, the data structure for envelope 223 includes an array of recipients 608, each of whom is identified by a name or alias and a role. As used herein, a recipient is a participant of the e-signing process but is not an e-signatory. A recipient can at least potentially make changes to one or more documents to be e-signed, and such a change can be detected as an on-the-fly event that can be remediated using the heretofore disclosed on-the-fly remediation techniques.

Further, the documents are identified in the envelope. More specifically, the envelope data structure includes attachments 610, which attachments can include identification of a subject document 225 as well as identification of any number of additional attachments such as images, evidence, addenda or rider documents, etc. The attachments themselves need not be included in the envelope, but rather, the identification of any attachment might be in the form of a network access point into the CMS that handles access to a location where the actual bits of the attachments are stored. The nature of such additional attachments might depend on the use case. For example, in insurance claims processing scenarios, an agent of the insured (e.g., an insurance agent) might provide an image (e.g., a photo) or other evidence that substantiates the extent of the insurance and/or the circumstances surrounding the cause of the loss for which the insured is filing (and e-signing) an insurance claim.

In many scenarios, some portion of the e-signing process is carried out by CMS-native of third-party provided workflows 612, which workflows can be triggered on the basis of the nature and/or sequence of e-sign system events. As such, the envelope might specify one or more triggered workflows 614. Similarly, it can sometimes happen that initiation of processing within an e-signature system arises due to events within and/or emitted from a triggering workflow 616. Accordingly, the envelope data structure includes an array that facilitates identification and registration of such triggering workflows within the e-signature system. Processing of identified triggering workflows by the e-signature system might include registering specific events of the triggering workflows with event processors of the e-signature system.

There are many situations where one or more of the attachments (e.g., subject documents, images, evidence, etc.) are content objects of the CMS. As such, there may be many situations where there are a potentially large number of CMS users who have at least some access to the content objects that comprise the attachments. In some embodiments, the envelope includes an array that holds designations of one or more collaboration groups 618. In some embodiments, the designation(s) codified into an envelope can be accessed by any CMS user device that has access to the envelope, and such a CMS user can expand the designation into the collaboration group constituents.

As used herein, a collaboration group refers to any set of identifiers pertaining to users of a content management system. Such identifiers may include usernames, email aliases, user device identification information, etc. A collaboration group can be associated with any number of attributes and attribute values, and such attributes and attribute values can be inherited by the members of a particular collaboration group. The constituency of a collaboration group serves to aid in cooperative activities over content management system documents and metadata. The constituency of a collaboration group may include collaborators who are not e-signatories and/or who are not named participants in a particular e-signing process.

As used herein, a collaborator refers to a content management system user profile record that comprises metadata that, directly or indirectly defines that user's access to content objects of the content management system. In some situations an e-signatory is a collaborator. In other situations an e-signatory is not a collaborator.

In certain embodiments, a particular envelope is delivered only to those who are named participants (e.g., e-signatories, delegates, administrators, etc.) in a particular e-signing process. Additionally or alternatively, the envelope is made available to certain collaboration groups (e.g., groups that include at least some of the e-signatories, their delegates, and/or administrators). As such, any user who is a member of one or more of the aforementioned certain collaboration groups can raise an on-the-fly event that might in turn affect the e-signing process. In fact, it can happen that a user who is a member of one or more of the aforementioned certain collaboration groups, but is not one of the named participants (e.g., e-signatories, delegates, administrators, etc.) can nevertheless raise an on-the-fly event that might in turn affect the e-signing process for those who are named participants.

As the actions that are encoded into the envelope and/or its corresponding workflow are carried out, and/or as the actions inherent in the context defined by the envelope are carried out, a log of events pertaining to the envelope items is maintained. As shown, the data structure for envelope 223 can include a series of audit trail events 620. In some cases, rather than including the series of audit trail events in the envelope itself, one or more levels of indirection are provided (e.g., via pointers or links) such that the audit trail events can be reconstructed at any moment in time. In some cases, storage of the actual audit trail events is in a repository that has access controls to ensure that the audit trail cannot be altered except by vetted and authenticated users or programs.

In some implementations, the envelope and its contents and/or the audit trail entries inherit security settings from the environment. In some implementations, the envelope and its contents are subjected to inherited governance and compliance policies. In some implementations, the envelope includes authentication seals 622, which authentication seals can be made available to participants in the e-signing process such that any particular participant can self-verify that the envelope or the subject document(s) or other attachments have not been tampered with.

Instruction Code Examples

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address handling change events during an e-signature process. The partitioning of system 7A00 is merely illustrative and other partitions are possible.

Variations of the foregoing may include more or fewer of the shown modules. Certain variations may perform more or fewer (or different) steps and/or certain variations may use data elements in more, or in fewer, or in different operations. As an option, the system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module.

The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: configuring a content management system to store an executable module, the content management system exposing content objects to a plurality of collaborators, wherein the executable module is configured to acquire the electronic signature for one or more of the content objects by interacting with an Internet-facing interface that is accessed by one or more user devices (module 7A20); populating an envelope data structure with a designation of at least one of the one or more of the content objects to be electronically signed by at least one e-signatory (module 7A30); detecting a change made to the at least one of the one or more of the content objects, wherein the change was made by one of the plurality of collaborators who is not the at least one e-signatory (module 7A40); requesting an e-signature from the at least one e-signatory by (module 7A50); analyzing at least one difference between previous contents of the at least one of the one or more of the content objects before the change as compared to changed contents of the at least one of the one or more of the content objects after the change (module 7A60); advising the at least one e-signatory of the at least one difference (module 7A70); and requesting that the at least one e-signatory perform steps to e-sign the at least one of the one or more of the content objects (module 7A80).

Still further, some embodiments include variations in the operations performed, and some embodiments include variations of aspects of the data elements used in the operations.

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: configuring a content management system to implement an e-signing process by executing code of an executable module that is integrated into the content management system (CMS), wherein the CMS exposes stored content objects to a plurality of user devices through an electronic interface, and wherein the executable module is configured to associate e-signing metadata to one or more of the stored content objects, the e-signing metadata being indicative that a particular portion of the one or more of the stored content objects has been e-signed by a particular e-signatory (module 7B20); populating an envelope data structure with a designation of at least one of the one or more of the stored content objects to be electronically signed using one of the plurality of user devices that is under operation by the particular e-signatory (module 7B30); receiving an e-signature from the particular e-signatory (module 7B40); after receiving the e-signature from the particular e-signatory, then detecting a change made to the at least one of the one or more of the stored content objects (module 7B50); and notifying at least the particular e-signatory of the change to the one or more of the stored content objects (module 7B60).

System Architecture Overview

Additional System Architecture Examples

Figure 8A:
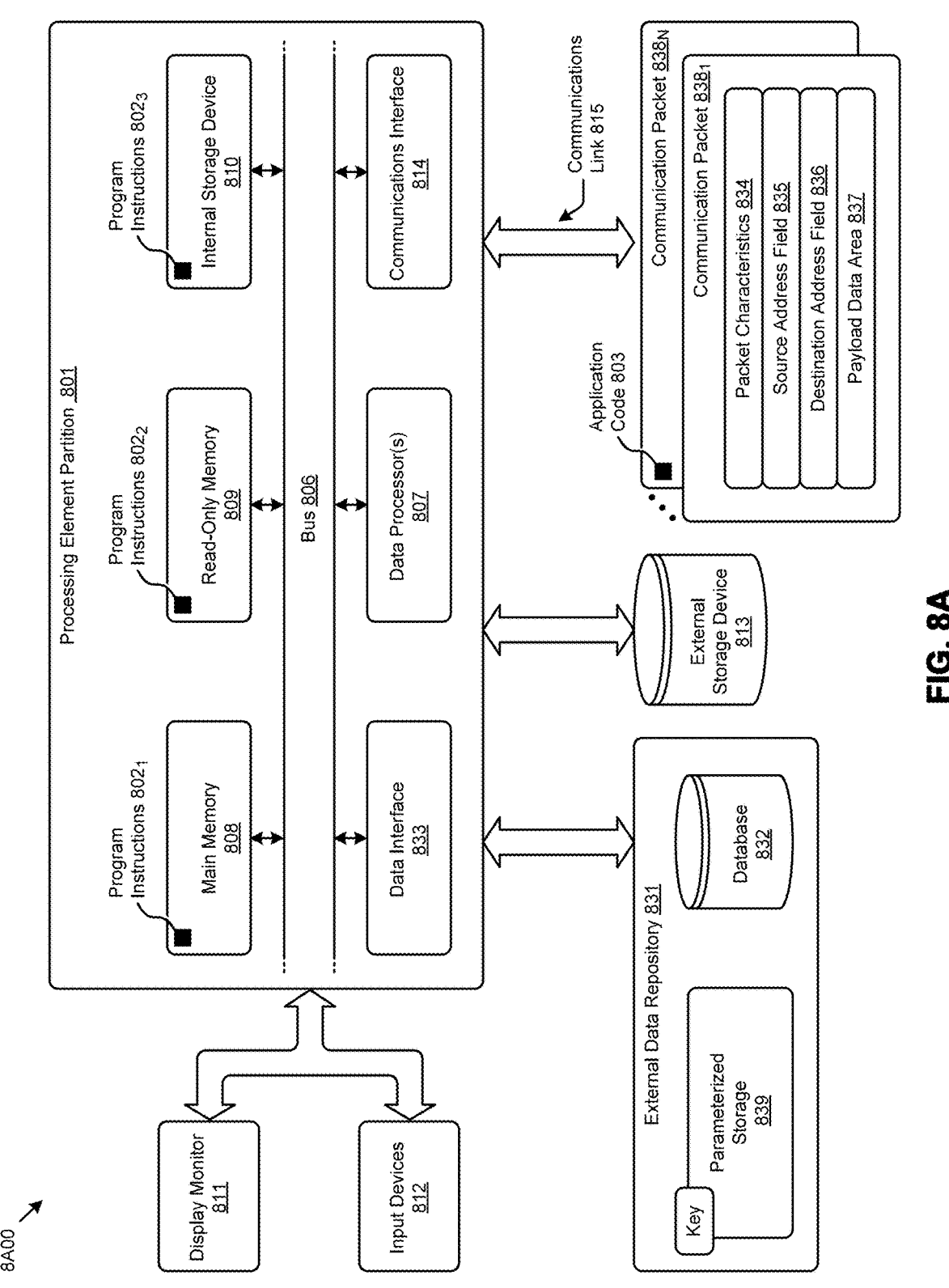
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet 838₁, communication packet 838_N) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to handling electronic signatures in collaboration systems. A module may include one or more state machines and/or combinational logic used to implement or facilitate the operational and/or performance characteristics pertaining to handling electronic signatures in collaboration systems.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of handling electronic signatures in collaboration systems). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to handling electronic signatures in collaboration systems, and/or for improving the way data is manipulated when performing computerized operations pertaining to applying on-the-fly changes to an e-signature process based on on-the-fly event detection and/or conflict remediation actions that affect the e-signature process.

Figure 8B:
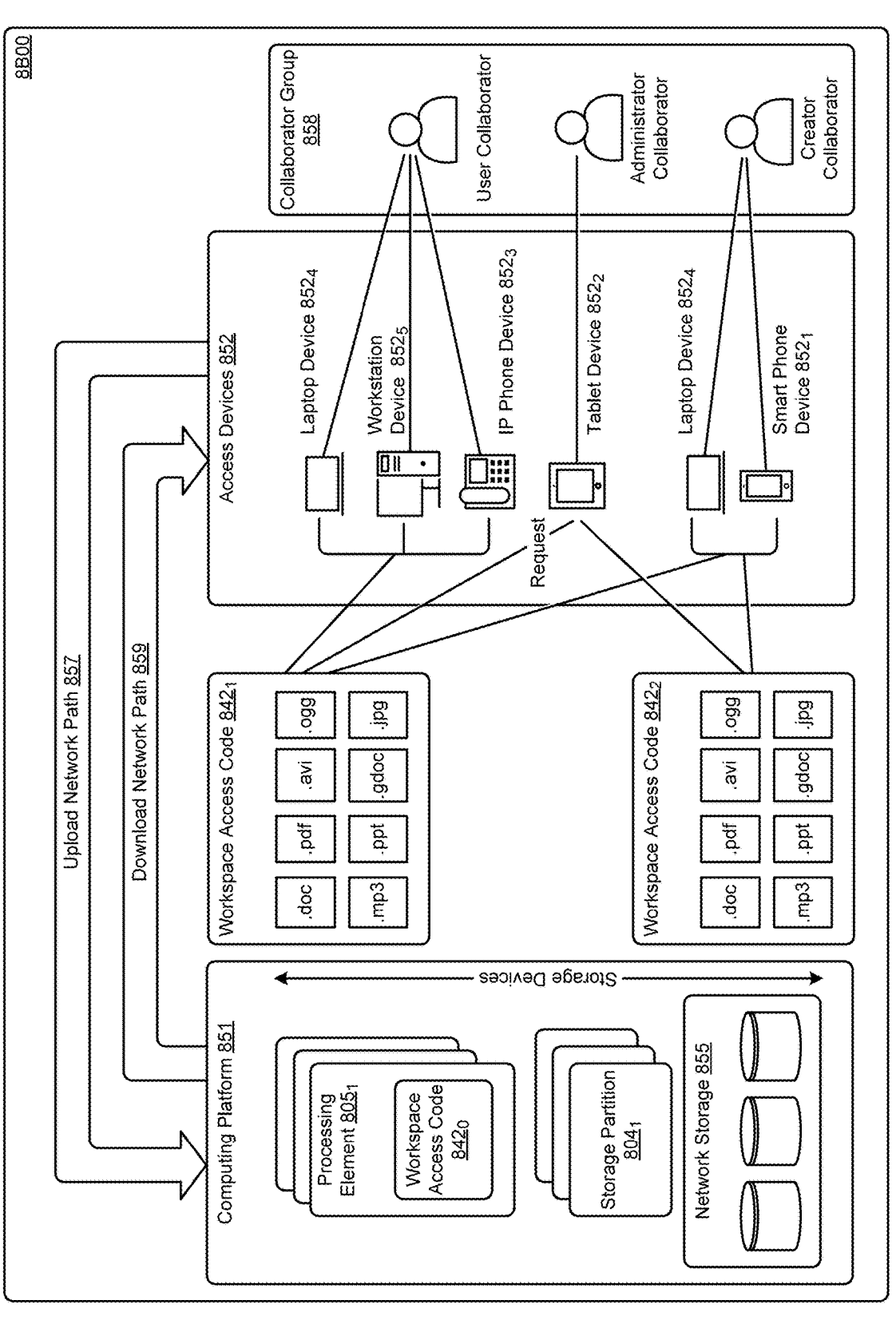

FIG. 8B depicts a block diagram of an instance of a cloud-based environment 8B00. Such a cloud-based environment supports access to workspaces through the execution of workspace access code (e.g., workspace access code 842₀, workspace access code 842₁, and workspace access code 842₂). Workspace access code can be executed on any of access devices 852 (e.g., laptop device 852₄, workstation device 852₅, IP phone device 852₃, tablet device 852₂, smart phone device 852₁, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for handling changes during electronic signature processing in a networked computing environment, the method comprising:

executing, in the networked computing environment, a content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory;

determining, by the CMS during execution of the e-signing process, whether a conflict exists between a change and one or more other changes, determining whether the conflict exists comprising:

detecting the change during the execution of the e-signing process, and determining a handling process for the change that has been detected, wherein detecting the change during the execution of the e-signing process comprises:

determining whether the change occurs after an envelope data structure generated for the e-signing process has been sent to at least the e-signatory or whether the e-signatory has already viewed at least a portion of the envelope data structure, upon determining that the change occurs after the envelope data structure has been sent to at least the e-signatory or the e-signatory has already viewed at least a portion of the envelope data structure, generating and transmitting, via the electronic interface, a notification to a first user computing device that generated the envelope data structure, and determining, based at least in part upon a response received via the electronic interface from the first user computing device, whether to continue the e-signing process with the at least one content object or to continue the e-signing process with the at least one content object to which the change has been made; and upon determining that the conflict exists during execution of the e-signing process, performing, by the CMS, a remediating action for the change.

2. The method of claim 1, the handling process for the change comprising:

determining an impact of the change on the e-signing process or on one or more other changes, wherein the remediating action is based at least in part upon the impact or nature of the change.

3. The method of claim 2, the handling process for the change comprising at least one of:

determining how the change is to be presented to the e-signatory or one or more other e-signatories for the e-signing process;

determining whether the change affects the one or more content objects or an envelope data structure generated for the e-signing process;

preparing an abstract for the change; or adding one or more ephemeral annotations corresponding to the change or the one or more changes.

4. The method of claim 2, the handling process for the change comprising:

executing a comparison process between the at least one content object and modified version of the at least one content object.

5. The method of claim 4, the handling process for the change further comprising:

generating a redlined version of the at least one content object; and transmitting, via the electronic interface of the CMS, the redlined version of the at least one content object to the e-signatory or to one or more other e-signatories.

6. The method of claim 1, detecting the change further comprising:

identifying a plurality of types of changes that can be made to the at least one content object, wherein the plurality of types of changes includes a first type which, when made to the at least one content object, does not require the CMS or the e-signing process be restarted and a second type which, when made to the at least one content object, requires the CMS or the e-signing process be restarted; and in response to the change that has been detected, determining whether the change belong to the first type or the second type.

7. The method of claim 6, detecting the change further comprising:

upon determining that the change belongs to the second type, advising the e-signatory of a potential conflict due to the change being detected; and upon determining that the change belongs to the second type, determining whether the e-signatory has already signed the at least one content object; and sending, via the electronic interface, an electronic notification to the e-signatory to re-sign the at least one content object to which the change has been made.

8. The method of claim 6, detecting the change further comprising:

upon detecting the change, determining whether the e-signatory initiates an e-signature event for the e-signing process; and upon determining that the e-signatory has initiated the e-signature event, notifying the e-signatory of the change that has been detected.

9. The method of claim 6, detecting the change further comprising:

upon detecting the change, determining whether the e-signatory has already electronically signed the at least one content object; and upon determining that the e-signatory has already electronically signed the at least one content object, sending, via the electronic interface of the CMS, an electronic notification of the change to the e-signatory; and determining and presenting an option from a plurality of options to the e-signatory, wherein the option includes re-signing the at least one content object, reviewing the at least one content object, or declining to electronically sign the at least one content object.

10. The method of claim 9, detecting the change further comprising: upon determining that the option is to decline to electronically sign the at least one content object or the e-signatory has declined to electronically sign the at least one content object, and implementing a first additional change to transform the at least one content object into an updated content object or a second additional change to the envelope data structure to transform the envelope data structure into an updated envelope data structure.

11. The method of claim 1, further comprising:

generating and transmitting, via the electronic interface, the envelope data structure to the e-signatory, based at least in part upon an envelope generation policy, wherein the envelope data structure includes an instruction and a constituent document, and the instruction is referenced by a subsequent event or processing action during execution of the e-signing process.

12. The method of claim 1, further comprising monitoring and determining a state of the e-signing process, wherein the state of the e-signing process comprises a waiting state, an editing state, a remediating state, an e-signing state, or a transition between two states.

13. A non-transitory computer readable medium having stored therein a sequence of instructions which, when stored in memory and executed by a processor or a processor core, cause the processor or the processor core to perform a set of acts, the set of acts comprising:

executing, in a networked computing environment, a content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory;

determining, by the CMS during execution of the e-signing process, whether a conflict exists between a change and one or more other changes, based at least in part on determining whether the change occurs after an envelope data structure generated for the e-signing process has been sent to at least the e-signatory or whether the e-signatory has already viewed at least a portion of the envelope data structure;

upon determining that the change occurs after the envelope data structure has been sent to at least the e-signatory or the e-signatory has already viewed at least a portion of the envelope data structure, generating and transmitting, via the electronic interface, a notification to a first user computing device that generated the envelope data structure' determining, based at least in part upon a response received via the electronic interface from the first user computing device, whether to continue the e-signing process with the at least one content object or to continue the e-signing process with the at least one content object to which the change has been made;

identifying a plurality of types of changes that can be made to the at least one content object, wherein the plurality of types of changes includes a first type which, when made to the at least one content object, does not require the CMS or the e-signing process be restarted and a second type which, when made to the at least one content object, requires the CMS or the e-signing process be restarted, and in response to the change that has been detected, determining whether the change belong to the first type or the second type; and upon determining that the conflict exists during execution of the e-signing process, performing, by the CMS, a remediating action for the change.

14. The non-transitory computer readable medium of claim 13 having stored thereupon the sequence of instructions which, when stored in the memory and executed by the processor, further causes the processor to perform the set of acts, the set of acts further comprising:

detecting the change during the execution of the e-signing process; and determining a handling process for the change that has been detected, the handling process for the change comprising:

determining an impact of the change on the e-signing process or on one or more other changes;

determining that the conflict exists between the change and the one or more other changes; and performing the remediating action based at least in part upon the impact or nature of the change.

15. A system, comprising:

a processor or a processor core; and a memory having stored therein a sequence of instructions which, when executed by the processor or the processor core, causes the processor or the processor core to perform a set of acts, the set of acts comprising:

executing, in a networked computing environment, a content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory;

determining, by the CMS, during execution of the e-signing process, whether a conflict exists between a change and one or more other changes, determining whether the conflict exists comprising:

detecting the change during execution of the e-signing process, and determining a handling process for the change that has been detected, wherein detecting the change during execution of the e-signing process comprises determining whether the change occurs after an envelope data structure generated for the e-signing process has been sent to at least the e-signatory or whether the e-signatory has already viewed at least a portion of the envelope data structure, upon determining that the change occurs after the envelope data structure has been sent to at least the e-signatory or the e-signatory has already viewed at least a portion of the envelope data structure, generating and transmitting, via the electronic interface, a notification to a first user computing device that generated the envelope data structure, determining, based at least in part upon a response received via the electronic interface from the first user computing device, whether to continue the e-signing process with the at least one content object or to continue the e-signing process with the at least one content object to which the change has been made, and identifying a plurality of types of changes that can be made to the at least one content object, wherein the plurality of types of changes includes a first type which, when made to the at least one content object, does not require the CMS or the e-signing process be restarted and a second type which, when made to the at least one content object, requires the CMS or the e-signing process be restarted, and in response to the change that has been detected, determining whether the change belong to the first type or the second type; and upon determining that the conflict exists during execution of the e-signing process, performing a remediating action for the change.

16. The system of claim 15, the memory further having stored therein the sequence of instructions which, when executed by the processor or the processor core, causes the processor or the processor core to perform a set of acts, the set of acts further comprising:

determining whether the e-signatory has already electronically signed the at least one content object;

upon determining that the e-signatory has already electronically signed the at least one content object, sending, via the electronic interface of the CMS, an electronic notification of the change to the e-signatory; and determining and presenting an option from a plurality of options to the e-signatory, wherein the option includes re-signing the at least one content object, reviewing the at least one content object, or declining to electronically sign the at least one content object; and upon determining that the option is to decline to electronically sign the at least one content object or the e-signatory has declined to electronically sign the at least one content object, implementing a first additional change to transform the at least one content object into an updated content object or a second additional change to the envelope data structure to transform the envelope data structure into an updated envelope data structure.

17. A computer-implemented method for handling changes during electronic signature processing in a networked computing environment, the method comprising:

executing, in the networked computing environment, a computerized content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory; and determining, by the CMS during execution of the e-signing process, whether a conflict exists between a change and one or more other changes, determining whether the conflict exists comprising:

detecting the change during the execution of the e-signing process, and determining a handling process for the change that has been detected, the handling process for the change comprising:

determining an impact of the change on the e-signing process or on one or more other changes, determining that the conflict exists between the change and the one or more other changes, executing a comparison process between the at least one content object and modified version of the at least one content object, generating a redlined version of the at least one content object, and transmitting, via the electronic interface of the CMS, the redlined version of the at least one content object to the e-signatory or to one or more other e-signatories; and upon determining that the conflict exists during execution of the e-signing process, performing, by the CMS, the remediating action based at least in part upon the impact or nature of the change.

18. A computer-implemented method for handling changes during electronic signature processing in a networked computing environment, the method comprising:

executing, in the networked computing environment, a computerized content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory; and determining, by the CMS during execution of the e-signing process, whether a conflict exists between a change and one or more other changes;

upon determining that the conflict exists during execution of the e-signing process, performing, by the CMS, a remediating action for the change; and generating and transmitting, via the electronic interface of the CMS, an envelope data structure to the e-signatory, based at least in part upon an envelope generation policy, wherein the envelope data structure includes an instruction and a constituent document, and the instruction is referenced by a subsequent event or processing action during execution of the e-signing process.

19. A non-transitory computer readable medium having stored therein a sequence of instructions which, when stored in memory and executed by a processor or a processor core, cause the processor or the processor core to perform a set of acts, the set of acts comprising:

executing, in a networked computing environment, a content management system (CMS) on which an e-signing process is implemented by executing code that is integrated into the CMS, wherein the CMS is in communication with a plurality of user computing devices through respective networks and an electronic interface and exposes content objects stored thereon for collaboration by the plurality of user computing devices through the electronic interface, and the code, when executed, associates e-signing metadata to one or more content objects of the content objects;

identifying, by the CMS, at least one content object of the one or more content objects to be electronically signed in the e-signing process by an e-signatory;

determining, by the CMS during execution of the e-signing process, whether a conflict exists between a change and one or more other changes, determining whether the conflict exists comprising:

detecting the change during the execution of the e-signing process, and determining a handling process for the change that has been detected, the handling process for the change comprising:

determining an impact of the change on the e-signing process or on one or more other changes, determining that the conflict exists between the change and the one or more other changes, and executing the remediating action based at least in part upon the impact or nature of the change, and upon determining that the conflict exists during execution of the e-signing process, performing a remediating action for the change.

* * * * *